United States Patent
Mounier et al.

(10) Patent No.: US 11,861,065 B2
(45) Date of Patent: Jan. 2, 2024

(54) WEARABLE RING DEVICE AND USER INTERFACE PROCESSING

(71) Applicant: QUALCOMM Incorporated, San Diego, CA (US)

(72) Inventors: Sebastien Mounier, San Diego, CA (US); Ramesh Chandrasekhar, Oceanside, CA (US); Jonathan Kies, San Diego, CA (US); Tom Edward Botterill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/357,823

(22) Filed: Jun. 24, 2021

(65) Prior Publication Data

US 2022/0413609 A1    Dec. 29, 2022

(51) Int. Cl.
| | | |
|---|---|---|
| *G06F 3/0346* | (2013.01) | |
| *G06F 3/01* | (2006.01) | |
| *G06F 3/0354* | (2013.01) | |
| *G06F 3/038* | (2013.01) | |
| *G06F 3/04815* | (2022.01) | |
| *G06F 3/04845* | (2022.01) | |
| *G06F 3/0485* | (2022.01) | |

(52) U.S. Cl.
CPC .............. *G06F 3/014* (2013.01); *G06F 3/017* (2013.01); *G06F 3/038* (2013.01); *G06F 3/0346* (2013.01); *G06F 3/03547* (2013.01); *G06F 3/04815* (2013.01); *G06F 3/0485* (2013.01); *G06F 3/04845* (2013.01); *G06F 2203/0331* (2013.01); *G06F 2203/0384* (2013.01)

(58) Field of Classification Search
CPC ........ G06F 3/014; G06F 3/017; G06F 3/0346; G06F 3/03547; G06F 3/038; G06F 3/04815; G06F 3/04845; G06F 3/0485; G06F 2203/0331; G06F 2203/0384
See application file for complete search history.

(56) References Cited

U.S. PATENT DOCUMENTS

| | | | |
|---|---|---|---|
| 2001/0050672 A1* | 12/2001 | Kobayashi ............ | G06F 3/0304 345/158 |
| 2003/0142065 A1* | 7/2003 | Pahlavan .............. | G06F 3/0346 345/156 |
| 2011/0007035 A1 | 1/2011 | Shai | |

(Continued)

OTHER PUBLICATIONS

International Search Report and Written Opinion—PCT/US2022/033104—ISA/EPO—dated Sep. 20, 2022.

*Primary Examiner* — Jonathan A Boyd
(74) *Attorney, Agent, or Firm* — QUALCOMM Incorporated

(57) ABSTRACT

Systems, methods, and non-transitory media are provided for using a wearable ring device for extended reality (XR) functionalities. An example wearable device can include a structure defining a receiving space configured to receive a finger associated with a user, the structure including a first surface configured to contact the finger received via the receiving space; one or more sensors integrated into the structure, the one or more sensors being configured to detect a rotation of at least a portion of the structure about a longitudinal axis of the receiving space; and a wireless transmitter configured to send, to an electronic device, data based on the rotation.

48 Claims, 10 Drawing Sheets

(56) References Cited

U.S. PATENT DOCUMENTS

2013/0027294 A1* 1/2013 Nakagawa ............ G06F 3/0346
                                                    345/156
2016/0378184 A1   12/2016 Dow et al.
2019/0332140 A1* 10/2019 Wang ..................... G06F 3/011
2021/0096657 A1*  4/2021 D'Amone ............... G06F 3/014

* cited by examiner

WEARABLE RING DEVICE AND USER INTERFACE PROCESSING

TECHNICAL FIELD

The present disclosure generally relates to wearable devices for interacting with user interfaces. For example, aspects of the present disclosure relate to using a wearable ring device to interact with electronic devices and user interfaces such as extended reality (XR) interfaces on XR devices.

BACKGROUND

Extended reality (e.g., augmented reality, virtual reality, etc.) devices, such as smart glasses and head-mounted displays (HMDs), generally implement cameras and various sensors to track the position of the extended reality (XR) device and other objects within the physical environment. The XR reality devices can use the tracking information to provide a user of the XR device a realistic XR experience. For example, an XR device can allow a user to experience or interact with immersive virtual environments or content. To provide realistic XR experiences, XR technologies can integrate virtual content with the physical world, which can involve matching the relative pose and movement of objects and devices. The XR technologies can use tracking information to calculate the relative pose of devices, objects, and/or maps of the real-world environment in order to match the relative position and movement of the devices, objects, and/or the real-world environment, and anchor content to the real-world environment in a convincing manner. The relative pose information can be used to match virtual content with the user's perceived motion and the spatio-temporal state of the devices, objects, and real-world environment.

BRIEF SUMMARY

Systems and techniques are described herein for a wearable ring device for enhanced user experiences and user interface interactions and processing. According to at least one example, a method is provided for using a wearable ring device for input functionalities and/or user interface interactions. The method can include detecting, via one or more sensors on a wearable device, a rotation of at least a portion of the wearable device about a longitudinal axis of a receiving space associated with the wearable device, the wearable device including a structure defining the receiving space, wherein the receiving space is configured to receive a finger associated with a user, and wherein the structure comprises a first surface configured to contact the finger received via the receiving space; and sending, to an electronic device via a wireless transmitter of the wearable device, data based on the detected rotation.

According to at least one example, a non-transitory computer-readable medium is provided for using a wearable ring device for input functionalities and/or user interface interactions. The non-transitory computer-readable medium can include instructions which, when executed by one or more processing devices, cause the one or more processing devices to: detect, via one or more sensors on a wearable device, a rotation of at least a portion of the wearable device about a longitudinal axis of a receiving space associated with the wearable device, the wearable device including a structure defining the receiving space, wherein the receiving space is configured to receive a finger associated with a user, and wherein the structure includes a first surface configured to contact the finger received via the receiving space; and send, to an electronic device via a wireless transmitter of the wearable device, data based on the detected rotation.

According to at least one example, an apparatus is provided using a wearable device for input functionalities and/or user interface interactions. An example apparatus can include a wearable device including a structure defining a receiving space configured to receive a finger associated with a user, the structure comprising a first surface configured to contact the finger received via the receiving space; one or more sensors integrated into the structure, the one or more sensors being configured to detect a rotation of at least a portion of the structure about a longitudinal axis of the receiving space; and a wireless transmitter configured to send to an electronic device, data based on the detected rotation.

According to at least one example, another apparatus is provided using a wearable device for input functionalities and/or user interface interactions. An example apparatus can include a wearable device including means for detecting a rotation of at least a portion of the wearable device about a longitudinal axis of a receiving space associated with the wearable device, the wearable device including a structure defining the receiving space, wherein the receiving space is configured to receive a finger associated with a user, and wherein the structure comprises a first surface configured to contact the finger received via the receiving space; and sending, to an electronic device, data based on the detected rotation.

In some aspects, the method, non-transitory computer-readable medium, and apparatuses described above can adjust a state of the wearable device when the at least a portion of the structure is rotated by a certain amount, wherein adjusting the state includes turning on one or more components of the wearable device from an off state or switching the one or more components to higher power mode from a lower power mode.

In some examples, the data can include an extended reality (XR) input associated with an XR application at the electronic device. In some examples, sending the data can include sending the XR input.

In some examples, the data comprises one or more rotational measurements. In some cases, the one or more rotational measurements comprise at least one of a rotational angle, a rotational velocity, and a rotational acceleration.

In some examples, the one or more sensors are configured to detect at least one of a touch signal corresponding to one or more fingers contacting a second surface of the structure, an orientation of the structure, and a position of the structure relative to one or more objects. In some cases, the data comprises at least one of a magnitude of the touch signal, the orientation of the structure, the position of the structure relative to the one or more objects, and a distance between the structure and at least one of the electronic device directly or indirectly coupled to the wearable device and a different hand than a respective hand of the finger.

In some aspects, the method, non-transitory computer-readable medium, and apparatuses described above can send, to the electronic device via the wireless transmitter, one or more measurements from the one or more sensors, the one or more measurements corresponding to an additional orientation of the respective hand of the finger, wherein the XR input is based on the additional orientation of the respective hand and at least one of the rotation and the orientation of the structure.

In some examples, detecting the rotation of at least a portion of the structure about a longitudinal axis of the receiving space further comprises measuring at least one of a first rotation of a first portion of the structure about the longitudinal axis of the receiving space and a second rotation of a second portion of the structure about the longitudinal axis of the receiving space. In some examples, the second rotation is in a direction opposite to the first rotation.

In some cases, the data corresponds to an XR input to an XR application at the electronic device, and the XR input comprises at least one of scrolling virtual content rendered by the electronic device, scaling an object rendered by the electronic device, rotating the object rendered by the electronic device, moving the object rendered by the electronic device, defining a virtual plane in an environment rendered by the electronic device, and placing a virtual object rendered by the electronic device in one or more virtual planes in the environment rendered by the electronic device.

In some cases, the data corresponds to an XR input to an XR application at the electronic device, and the data comprises one or more measurements from the one or more sensors. In some examples, the one or more measurements can include at least one of a touch signal corresponding to one or more fingers contacting a second surface of the structure, an orientation of the structure, the rotation, a movement of a hand associated with the finger, and a position of the structure relative to one or more objects.

In some cases, the XR input is based on one or more properties associated with the one or more measurements in the data. In some examples, the one or more properties can include at least one of a magnitude of the rotation, a direction of the rotation, a velocity of the rotation, and a length of time of a pressure applied to one or more portions of the structure, the one or more properties being identified by the one or more measurements.

In some examples, the XR input is based on one or more properties associated with the touch signal, the one or more properties including at least one of a magnitude of pressure from the one or more fingers contacting the second surface of the structure, a motion associated with the one or more fingers when contacting the second surface of the structure, a direction of the motion, a length of time of contact between the one or more fingers and the second surface, and a pattern of contact of the second surface of the structure by the one or more fingers, the one or more properties being identified by the one or more measurements.

In some cases, the XR input can include modifying a virtual element along multiple dimensions in space, the virtual element comprising at least one of a virtual object rendered by the electronic device, a virtual plane in an environment rendered by the electronic device, and the environment rendered by the electronic device. In some examples, an adjustment of a first dimension of the multiple dimensions is defined by at least one of an angular change, a rotational velocity, and a rotational acceleration associated with the rotation, an adjustment of a second dimension of the multiple dimensions is defined by the one or more measurements, and the one or more measurements comprise at least one of a touch signal corresponding to one or more fingers contacting a second surface of the structure, an orientation of the structure, and a position of the structure relative to one or more objects.

In some examples, the one or more measurements comprise motion measurements corresponding to the movement of the hand associated with the finger, and the XR input corresponds to a request to measure a distance in physical space, the distance being defined by the movement of the hand.

In some examples, the wearable device comprises a wearable ring. In some cases, the wearable device comprises a wearable ring including an outer ring and an inner ring, the inner ring defines the receiving space, and the one or more sensors are configured to detect at least one of an angular change, a rotational velocity, and a rotational acceleration of the outer ring about the longitudinal axis of the receiving space.

In some examples, the electronic device comprises a mobile device. In some cases, the mobile device comprises one of a head-mounted display, a mobile phone, a portable computer, or a smart watch. In some examples, the one or more sensors comprise at least one of a position sensor, an accelerometer, a gyroscope, a pressure sensor, an audio sensor, a touch sensor, and an inertial measurement unit.

In some aspects, the apparatuses described above can include one or more sensors. In some aspects, the apparatuses described above can include a wearable ring. In some aspects, an apparatus described above can include a mobile device. In some examples, the apparatuses can include a hand controller, a mobile phone, a wearable device, a display device, a mobile computer, a head-mounted device, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
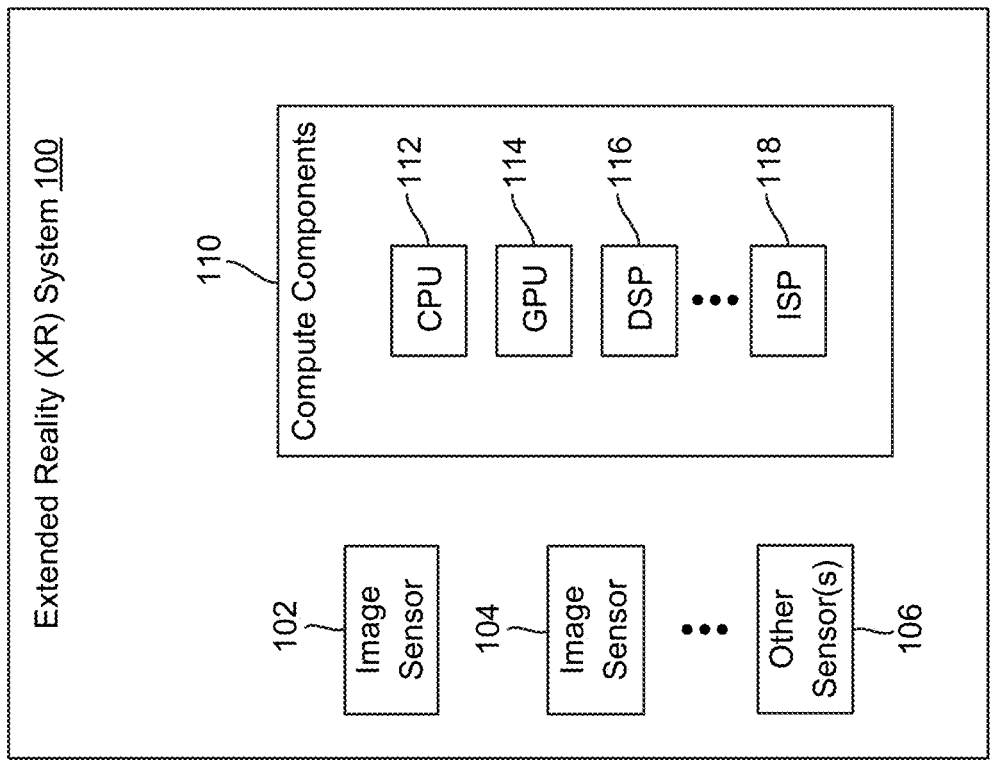
FIG. 1 is a diagram illustrating an example of an extended reality system and a ring device used for extended reality experiences and functionalities, in accordance with some examples of the present disclosure.
Figure 1:
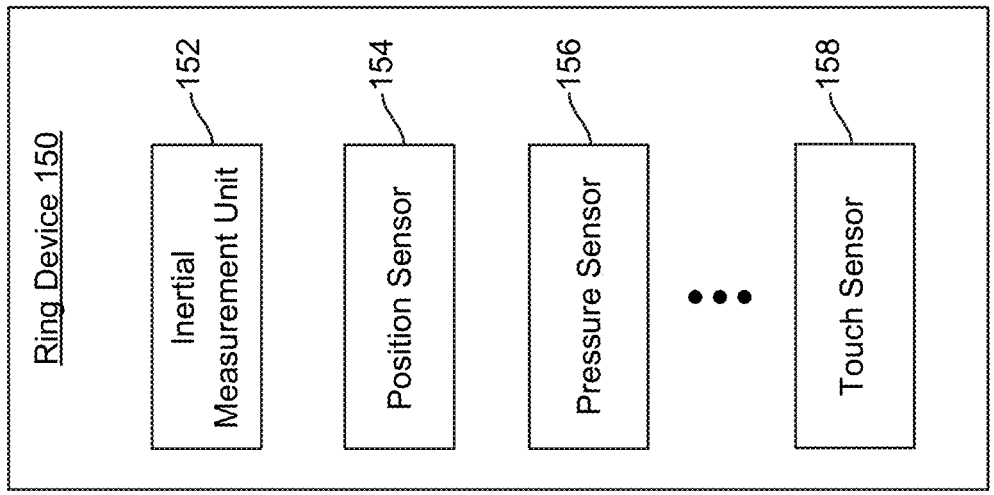

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously mentioned, extended reality (e.g., augmented reality, virtual reality, etc.) devices, such as smart glasses and head-mounted displays (HMDs), generally implement cameras and various sensors to track the position of the extended reality (XR) device and other objects within the physical environment. The XR reality devices can use such tracking information to provide a user of the XR device a realistic XR experience. For example, an XR device can allow a user to experience or interact with immersive virtual environments or content. To provide realistic XR experiences, XR technologies can integrate virtual content with the physical world, which can involve matching the relative pose and movement of objects and devices. The XR technologies can use tracking information to calculate the relative pose of devices, objects, and/or maps of the real-world environment in order to match the relative position and movement of the devices, objects, and/or the real-world environment, and anchor content to the real-world environment in a convincing/realistic manner. The relative pose information can be used to match virtual content with the user's perceived motion and the spatio-temporal state of the devices, objects, and real-world environment.

In some cases, XR devices can be paired with controllers that users can use to select and interact with content rendered by the XR devices during an XR experience. To enable realistic interactions with rendered content using controllers, the XR devices can use the cameras and other sensors on the XR devices to track a pose and movement of the controllers, and use the pose and motion of the controller to match the state of the controller with the user's perceived motion and the spatio-temporal state of rendered content and other objects in the environment. However, controller-based XR systems often require a significant amount of power and compute resources to implement, which can negatively impact the performance and battery life of the XR devices used with the controllers. Moreover, the use of controllers may not be intuitive for the user and, in many cases, can be difficult to use. For example, controllers can be difficult to use when the user of the controller is in certain positions, such as lying down or reclined. Controllers can also be difficult to use in space-constrained environments such as airplanes, crowded areas, etc.

In many cases, controllers used with XR devices can also create privacy issues. For example, a person or computer with visibility to the user of the controller can analyze the user's movements and interactions with the controller to recognize the user's interactions with the content rendered by the XR device during the XR experience as well as associated information, potentially putting the privacy of the user's information at risk. In some examples, an artificial intelligence (AI) interpreter or system can be used to process a recording of the user's interactions and identify the information provided by the user through the rendered XR interface. The AI interpreter or system could potentially recognize the information provided by the user through the XR interface. Accordingly, when a user is engaged in an XR experience using a controller associated with an XR device, the user could potentially expose inputs and associated information to other users, such as user selections, Personal Identification Numbers (PINs), gestures, etc. The user may want to protect the privacy of interactions with XR interfaces rendered by the XR device even if other users are not also engaged in the same XR experience as the user or able to see the XR interface.

In some aspects, systems, apparatuses, processes (also referred to as methods), and computer-readable media (collectively referred to herein as "systems and techniques") are described herein using a wearable device/accessory that interfaces/interacts with an electronic device (e.g., an XR device, a mobile device, a television, a smart wearable device, an electronic device with a user interface, or any other electronic device) to provide enhanced user interface, input, and/or XR experiences and functionalities. In some examples, a wearable accessory can be used with XR devices to securely and intuitively provide XR inputs and interact with XR content. The wearable accessory can include one or more sensors to assist with tracking, gesture detection, and/or content interaction functionalities, among others.

In some cases, the wearable accessory can be a ring or ring structure that can be worn on a user's finger or hand. A user can use the ring or ring structure during an XR experience to provide one or more types of inputs to an XR device providing the XR experience. The XR device can detect different modes of input, which can be converted (e.g., interpreted as, mapped to, etc.) into specific inputs and/or functionalities. For example, a user can wear a ring on a particular finger and rotate the ring about a longitudinal axis of the user's finger to scroll through content, manipulate rendered content, manipulate the XR environment, select content, generate measurements in the physical world, etc. As described herein, a longitudinal axis is generally parallel to a receiving space (e.g., a lumen) of the wearable accessory that provides a longitudinal access opening for a finger and at least a portion of the finger wearing the wearable accessory. A lateral axis is normal to the longitudinal axis and a transverse axis extends normal to both the longitudinal and lateral axes. The longitudinal direction is a direction substantially parallel to the longitudinal axis, the lateral direction is a direction substantially parallel to the lateral axis, and the transverse direction is a direction substantially parallel to the transverse axis.

Other example ways the user can provide an input to the XR device using the ring can include tapping the ring with a different finger than the finger wearing the ring, squeezing the ring with one or more fingers that are adjacent to the finger wearing the ring, rotating or swiping the ring with a finger such as a thumb, rotating or swiping the ring with one or more fingers that are adjacent to the finger wearing the ring, and/or otherwise physically interacting with the ring. In some cases, the user can use motion of the finger wearing the ring and/or the hand to provide one or more types of inputs to the XR device based on the tracked motion of the finger and/or the hand. In some examples, the ring can include one or more sensors to detect such motion and/or interactions with the ring. The ring can include a wireless interface to send measurements corresponding to detected inputs to the XR device.

In some cases, different modes of input using the ring can correspond to, and/or can be converted into (e.g., interpreted as), different types of XR inputs. For example, the user can rotate the ring about a longitudinal axis of the finger wearing the ring and/or rotate a rotatable portion of the ring about a longitudinal axis of the ring and relative to another portion of the ring to scroll through content, forward or rewind a video or any other sequence of content, move rendered content (e.g., rotate content, etc.), navigate content, etc. As another example, the user can tap or swipe the ring to perform a selection; move the finger wearing the ring (and/or the hand with the finger wearing the ring) to provide gestures, manipulate XR content and/or environments, define a plane, create XR spaces and/or content, etc.; among other things. In general, because of the configuration of the ring (e.g., the size, shape, etc.) and how it is used by the user (e.g., worn on a finger, wrist, etc.), user interactions with the ring can be more discreet, inconspicuous, and/or otherwise harder to detect/notice than user interactions with a different controller device. Thus, the privacy and associated data of XR inputs provided via the ring on the user's finger can be better protected from people and other devices in the environment. Moreover, the user can easily and conveniently provide inputs using the ring even when the user is in space-constrained areas, lying down and/or otherwise positioned in way that would be difficult to otherwise move a controller to generate an input.

In some cases, the ring can reduce power consumption and resource usage at the XR device. For example, the ring can offload certain operations such as hand tracking and/or other tracking operations from the XR device, allowing the XR device to reduce power consumption and resource usage such as sensor, camera, and/or compute resource usage. In some examples, when tracking operations are offloaded from the XR device to the ring, the XR device can turn off, or reduce a power mode of, one or more tracking resources such as cameras and/or other sensors that the XR device would otherwise use to track the user's hands and/or other objects.

The ring can include one or more sensors to track and detect activity such as, for example, motion, inputs, etc. For example, the ring can include a rotary encoder to track rotation and/or swiping of the ring (and/or portions thereof) for one or more types of inputs. An inertial measurement unit (IMU) in the ring can integrate multi-axes, accelerometers, gyroscopes, and/or other sensors (e.g., magnetometers, etc.) to provide the XR device an estimate of the hand's pose in physical space. One or more sensors in the ring, such as ultrasonic transmitters/transducers and/or microphones, can be used for ranging of the hands. In some examples, one or more ultrasonic transmitters/transducers and/or microphones can help determine if the user's hands are closer together or farther apart, if any of the user's hands are close to one or more other objects, etc. In some examples, a barometric air pressure sensor in the ring can determine relative elevation changes and can be used to interpret selection events. The ring can send measurements from one or more sensors to the XR device, which can convert the sensor measurements into user inputs. The ring can provide new user experience (UX) functionalities that enable easier, more intuitive actions by the user, and enable various types of actions based on sensor inputs.

In some examples, the ring can enable scrolling and other actions via one or more interactions with the ring. For example, in some cases, the ring can include an outer ring and an inner ring. The outer ring can spin around and/or relative to the inner ring. The ring can include a rotary encoder to detect a rotation magnitude. The ring can send the rotation magnitude to the XR device, which can convert the rotation magnitude into an input such as a scroll magnitude. In some cases, the entire ring can spin around the user's finger (or a portion of the user's finger), and an IMU in the ring can detect the spin motion to determine an input such as a scroll magnitude. In some cases, the ring can include a touch sensor to provide touch sensitivity at one or more areas of the ring and/or across a surface of the ring to detect touch inputs such as a selection, a scroll magnitude, etc. In some examples, a touch sensor can be positioned on an outside of the ring, making the ring non-symmetric. The touch area can be akin to a small touch pad and can be used by a different finger to provide inputs. For example, the touch area can be akin to a small touch pad that can be used by a thumb when the ring is on the index finder.

The ring can be equipped with various power saving features. For example, in some cases, the ring can save power by shutting down after the XR application on the XR device has stopped and/or been terminated. As another example, the ring can remain off or in a lower power mode, and turn on or switch to higher power mode based on one or more user interactions/inputs. For example, the ring can remain off or in a lower power mode, and turn on or switch to higher power mode when the ring is rotated by a certain amount.

The ring can provide privacy benefits, as previously explained, as well as other benefits. For example, with the ring, the user does not have to (but can) wave any hands or fingers in the air to generate an input. As another example, the ring can conserve power of the XR device by providing tracking functionalities and allowing the XR device to turn off or power down resources on the XR device such as, for example, cameras, tracking sensors, etc. In some cases, the ring can include a processor or chip that provides various functionalities, and can interact with a processor and/or chip on the XR device.

Figure 6:
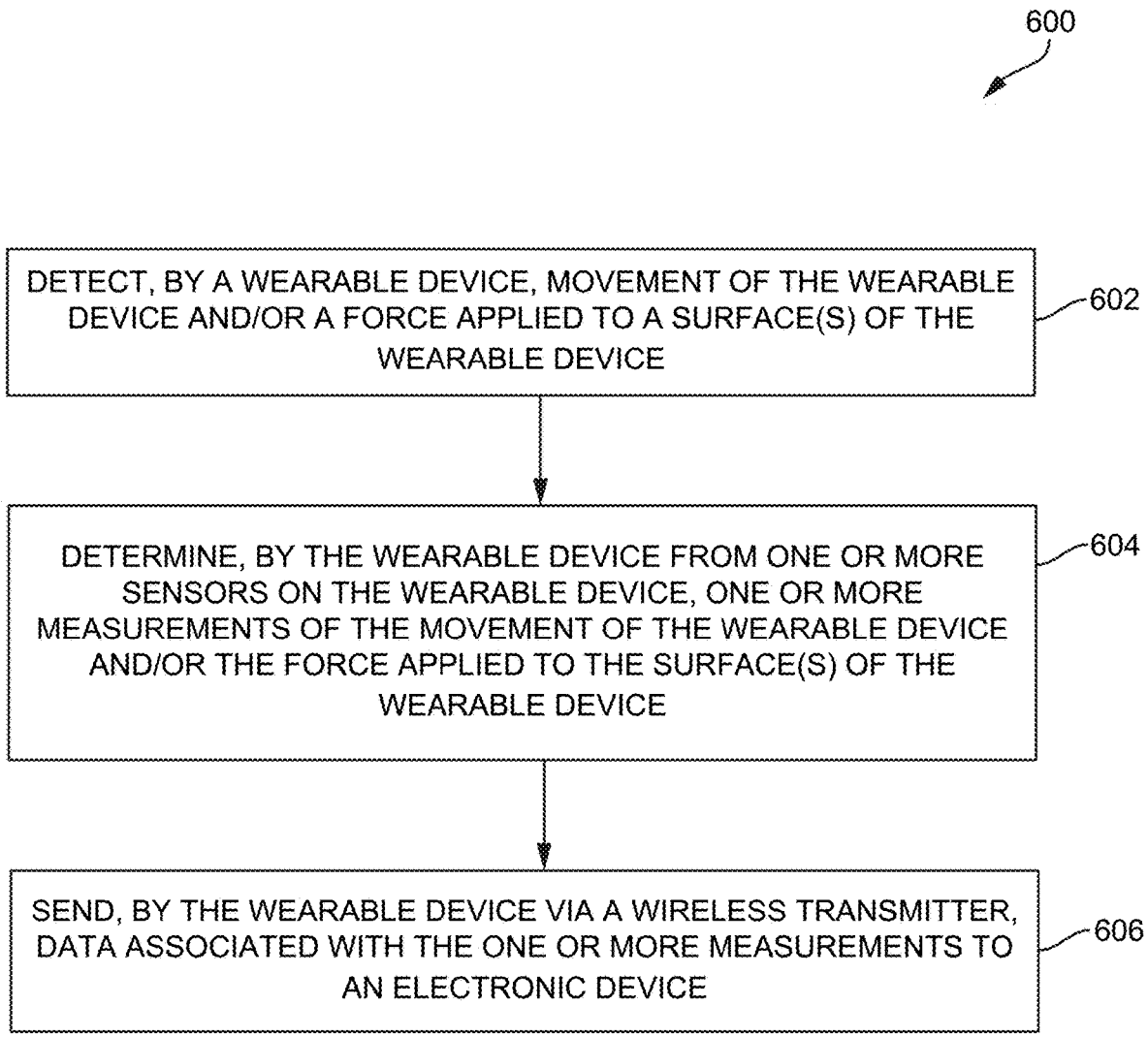
FIG. 6 is a flowchart illustrating an example process for using a ring device to enhance extended reality functionalities, in accordance with some examples of the present disclosure.
Figure 7:
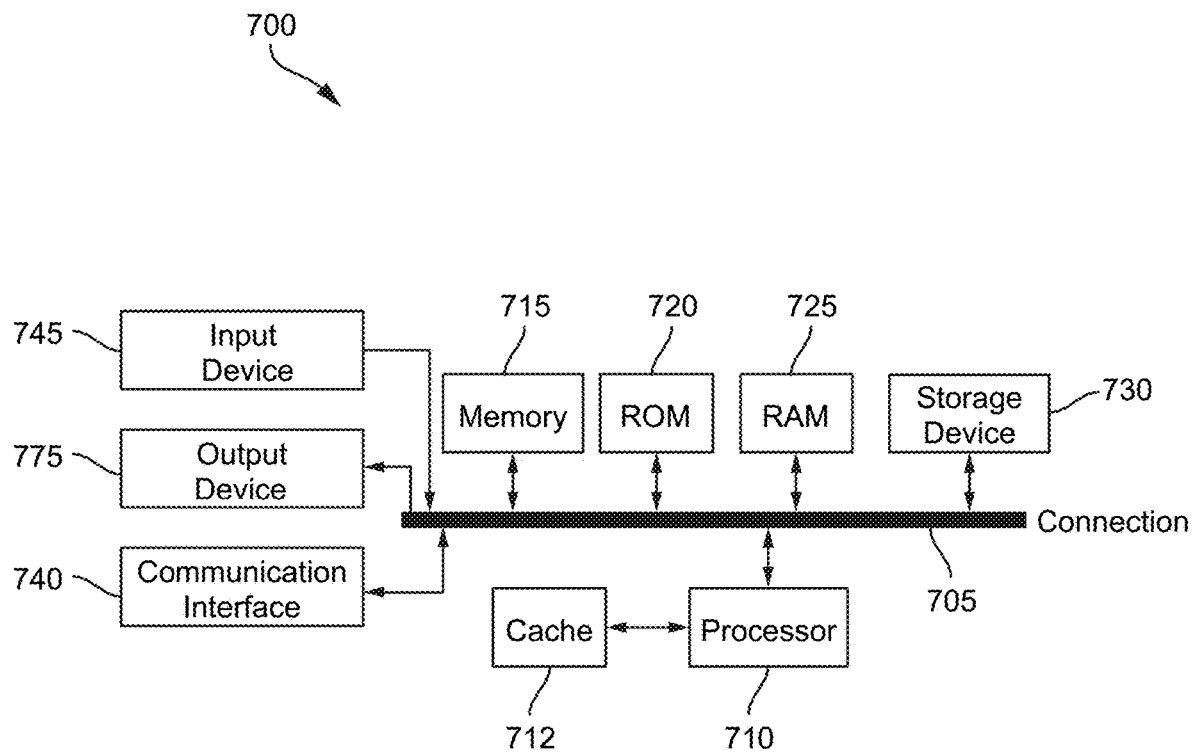
FIG. 7 illustrates an example computing device architecture, in accordance with some examples of the present disclosure.

The present technologies will be described in the following disclosure as follows. The discussion begins with a description of example systems and techniques for providing enhanced XR functionalities/experiences using a ring device, as illustrated in FIGS. 1 through 5. A description of an example process for using a ring device for XR functionalities, as illustrated in FIG. 6, will then follow. The discussion concludes with a description of an example computing device architecture including example hardware components suitable for performing XR and associated operations, as illustrated in FIG. 7. The disclosure now turns to FIG. 1

FIG. 1 is a diagram illustrating an example of an XR system 100 and a ring device 150 for XR experiences and functionalities, in accordance with some examples of the present disclosure. The XR system 100 and the ring device 150 can be communicatively coupled to provide various XR functionalities. The XR system 100 and the ring device 150 can include separate devices used as described herein for XR experiences and functionalities. In some examples, the XR system 100 can implement one or more XR applications such as, for example and without limitation, a video game application, a robotic application, an autonomous driving or navigation application, a productivity application, and/or any other XR application.

In some examples, the XR system 100 can include an electronic device configured to use information about the relative pose of the XR system 100 and/or the ring device 150 to provide one or more functionalities, such as XR functionalities, gaming functionalities, autonomous driving or navigation functionalities, computer vision functionalities, robotic functions, etc. For example, in some cases, the XR system 100 can be an XR device (e.g., a head-mounted display, a heads-up display device, smart glasses, a smart television system, etc.) and the ring device 150 can generate inputs used to interact with the XR system 100 and/or content provided by the XR system 100.

In the illustrative example shown in FIG. 1, the XR system 100 can include one or more image sensors, such as image sensor 102 and image sensor 104, other sensors 106, and one or more compute components 110. The other sensors 106 can include, for example and without limitation, an inertial measurement unit (IMU), a gyroscope that is separate from a gyroscope in the IMU, an accelerometer that is separate from an accelerometer of the IMU, a magnetometer that is separate from a magnetometer of the IMU, a radar, a light detection and ranging (LIDAR) sensor, an audio sensor, a position sensor, a pressure sensor, and/or any other sensor. In some examples, the XR system 100 can include additional sensors and/or components such as, for example, a light-emitting diode (LED) device, a storage device, a cache, a communications interface, a display, a memory device, etc. An example architecture and example hardware components that can be implemented by the XR system 100 are further described below with respect to FIG. 7.

Moreover, in the illustrative example shown in FIG. 1, the ring device 150 includes an IMU 152, a position sensor 154 (e.g., a position/rotation encoder and/or any other type of position/rotation sensor), a pressure sensor 156 (e.g., a barometric air pressure sensor and/or any other pressure sensor), and a touch sensor 158 (or tactile sensor). The sensor devices shown in FIG. 1 are non-limiting examples provided for explanation purposes. In other examples, the ring device 150 can include more or less sensors than shown in FIG. 1. Moreover, in some cases, the ring device 150 can include other types of sensors such as, for example, an audio sensor, a light sensor, an image sensor, etc.

It should be noted that the components shown in FIG. 1 with respect to the XR system 100 and the ring device 150 are merely illustrative examples provided for explanation purposes and, in other examples, the XR system 100 and/or the ring device 150 can include more or less components than those shown in FIG. 1.

The XR system 100 can be part of, or implemented by, a single computing device or multiple computing devices. In some examples, the XR system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s). In some implementations, the image sensor 102, the image sensor 104, the one or more other sensors 106, and/or the one or more compute components 110 can be part of the same computing device.

For example, in some cases, the image sensor 102, the image sensor 104, the one or more other sensors 106, and/or the one or more compute components 110 can be integrated into a camera system, a smartphone, a laptop, a tablet computer, a smart wearable device, an XR device such as an HMD, an IoT device, a gaming system, and/or any other computing device. However, in other implementations, the image sensor 102, the image sensor 104, the one or more other sensors 106, and/or the one or more compute components 110 can be part of, or implemented by, two or more separate computing devices.

The one or more compute components 110 of the XR system 100 can include, for example and without limitation, a central processing unit (CPU) 112, a graphics processing unit (GPU) 114, a digital signal processor (DSP) 116, and/or an image signal processor (ISP) 118. In some examples, the XR system 100 can include other types of processors such as, for example a computer vision (CV) processor, a neural network processor (NNP), an application-specific integrated circuit (ASIC), a field-programmable gate array (FPGA), etc. The XR system 100 can use the one or more compute components 110 to perform various computing operations such as, for example, extended reality operations (e.g., tracking, localization, pose estimation, mapping, content anchoring, content rendering, etc.), image/video processing, graphics rendering, machine learning, data processing, modeling, calculations, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The image sensor 102 and the image sensor 104 can include any image and/or video sensor or capturing device, such as a digital camera sensor, a video camera sensor, a smartphone camera sensor, an image/video capture device on an electronic apparatus such as a television or computer, a camera, etc. In some cases, the image sensor 102 and/or the image sensor 104 can be part of a camera or computing device such as a digital camera, a video camera, an IP camera, a smartphone, a smart television, a game system, etc. Moreover, in some cases, the image sensor 102 and/or the image sensor 104 can include multiple image sensors, such as rear and front sensor devices, and can be part of a dual-camera or other multi-camera assembly (e.g., including two camera, three cameras, four cameras, or other number of cameras).

In some examples, the image sensor 102 and/or the image sensor 104 can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 110 can perform XR processing operations based on data from the image sensor 102, the image sensor 104, the one or more other sensors 106, and/or the ring device 150. For example, in some cases, the one or more compute components 110 can perform tracking, localization, pose estimation, mapping, content anchoring, content rendering, image processing, modeling, content generation, and/or other operations based on data from the image sensor 102, the image sensor 104, the one or more other sensors 106, and/or the ring device 150.

In some examples, the one or more compute components 110 can implement one or more algorithms for tracking and estimating a relative pose of the ring device 150 and the XR system 100. In some cases, the one or more compute components 110 can receive image data captured by the image sensor 102 and/or the image sensor 104 and perform pose estimation based on the received image data to calculate a relative pose of the ring device 150 and the XR system 100. In some cases, the one or more compute components 110 can implement one or more computer vision models to calculate the relative pose of the ring device 150 and the XR system 100.

In some cases, the one or more other sensors 106 can detect acceleration by the XR system 100 and generate acceleration measurements based on the detected acceleration. In some cases, the one or more other sensors 106 can additionally or alternatively detect and measure the orientation and angular velocity of the XR system 100. For example, the one or more other sensors 106 can measure the pitch, roll, and yaw of the XR system 100. In some examples, the XR system 100 can use measurements obtained by the one or more other sensors 106 to calculate the relative pose of the XR system 100.

The ring device 150 can use the IMU 152, the position sensor 154, the pressure sensor 156, and/or the touch sensor 158 to detect inputs for the XR system 100, as further described herein. The ring device 150 can detect one or more modes of input such as for example and without limitation, applying a force (e.g., tapping, squeezing, pressing, rubbing, swiping, touching, etc.) on one or more portions of the ring device 150, rotating and/or swiping one or more portions of the ring device 150, etc. The ring device 150 can provide one or more detected inputs to the XR system 100 to modify a content, operation, and/or behavior of the XR system 100.

In some cases, the ring device 150 can calculate a magnitude of an input and provide the magnitude of the input to the XR system 100 as part of a provided input. For example, the ring device 150 can calculate a magnitude of a force and/or rotation applied on the ring device 150 and provide the magnitude of force and/or rotation to the XR system 100 as an input. The XR system 100 can use the magnitude information to determine a type of input (e.g., a single click, double click, selection, scroll, gesture, object resizing, control input, settings input, etc.) and/or an input magnitude (e.g., an amount of scrolling, object resizing, environment/object manipulation, etc.).

In some examples, the ring device 150 and/or the XR system 100 can use measurements obtained by the IMU 152, the position sensor 154, and/or the pressure sensor 156, to calculate (and/or to assist in calculating) the location and/or relative pose of the ring device 150. In some cases, the IMU 152 can detect an orientation, velocity (e.g., rotational, linear, etc.), and/or acceleration (e.g., angular rate/acceleration, linear acceleration, etc.) by the ring device 150 and generate orientation, velocity and/or acceleration measurements based on the detected orientation, velocity, and/or acceleration. For example, in some cases, a gyroscope of the IMU 152 can detect and measure a rotational rate/acceleration by the ring device 150 (and/or a portion of the ring device 150). In some examples, the IMU 152 can additionally or alternatively detect and measure linear velocity and/or acceleration by the ring device 150. In some examples, the IMU 152 can additionally or alternatively detect and measure an orientation of the ring device 150. In some cases, the IMU 152 can additionally or alternatively detect and measure the orientation and angular velocity of the ring device 150. For example, the IMU 152 can measure the pitch, roll, and yaw of the ring device 150.

In some examples, the position sensor 154 can calculate a position of the ring device 150 in terms of rotational angle, linear motion, and three-dimensional (3D) space. For example, the position sensor 154 can detect a rotation and/or spin of the ring device 150. The pressure sensor 156 can detect pressure such as air pressure, and can determine relative pressure changes. In some examples, measurements from the pressure sensor 156 can be used as inputs to interpret content selection events. The touch sensor 158 can measure physical forces or interactions with the ring device 150, which can be interpreted as inputs to the XR system 100, as further described herein.

The ring device 150 can include one or more wireless communication interfaces (not shown) for communicating with the XR system 100. The one or more wireless communication interfaces can implement any wireless protocol and/or technology to communicate with the XR system 100, such as short-range wireless technologies (e.g., Bluetooth, etc.) for example. The ring device 150 can use the one or more wireless communication interfaces to transmit sensor measurements and/or other XR inputs to the XR system 100, as further described herein.

While the XR system 100 and the ring device 150 are shown to include certain components, one of ordinary skill will appreciate that the XR system 100 and the ring device 150 can include more or fewer components than those shown in FIG. 1. For example, the XR system 100 and/or the ring device 150 can also include, in some instances, one or more other memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and hardware components that can be implemented with the XR system 100 and/or the ring device 150 described below with respect to FIG. 7.

Figure 2A:
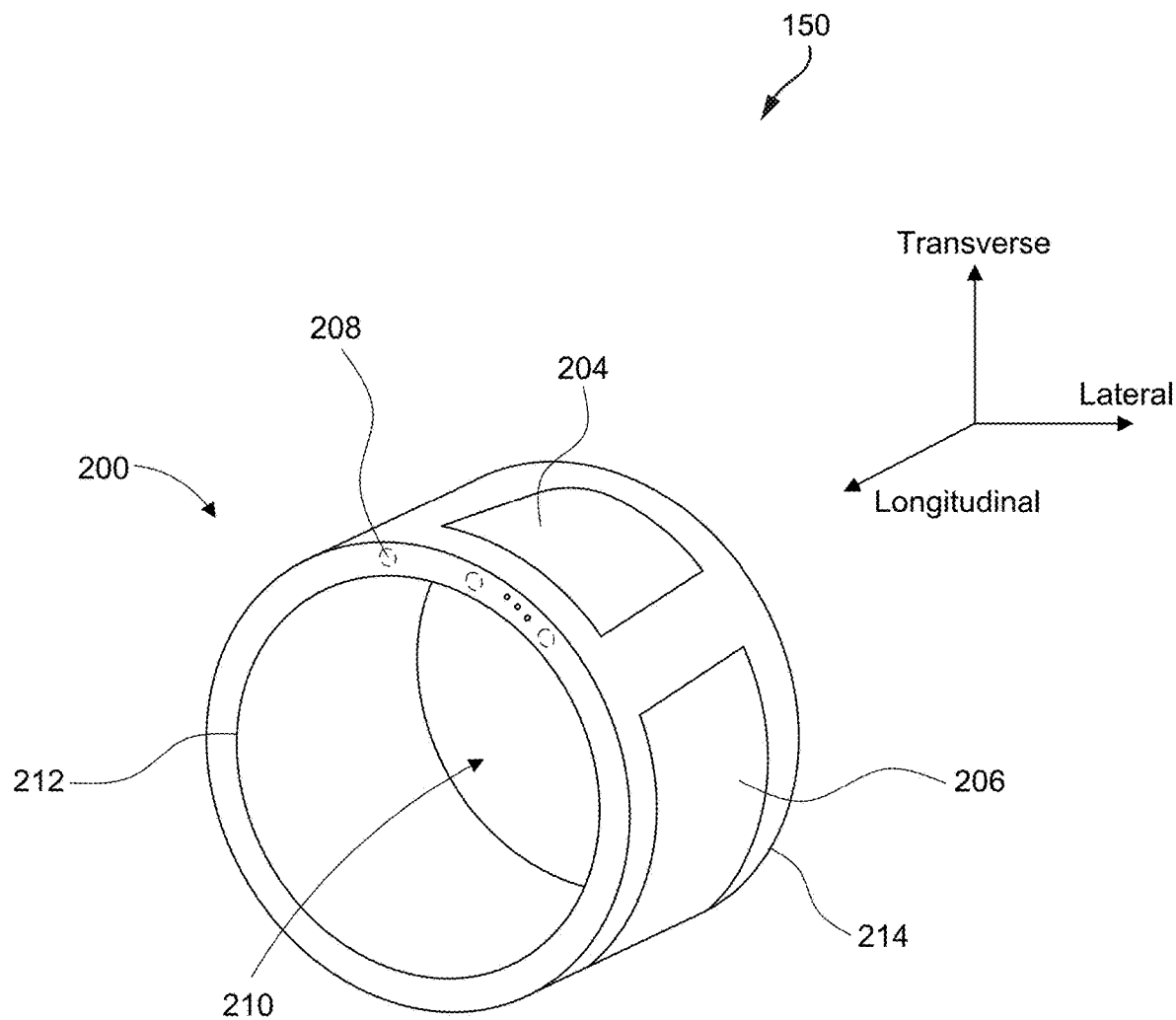
FIGS. 2A and 2B illustrate example ring devices, in accordance with some examples of the present disclosure.

FIG. 2A illustrates an example of the ring device 150. The user can use the ring device 150 to interact with the XR system 100 and provide various types of XR inputs as further described herein. In some examples, the ring device 150 can collect sensor measurements to track a location and/or pose of the ring device 150 in 3D space. In some examples, the location and/or pose can be tracked relative to a location and/or pose of the XR system 100 in 3D space.

In this example, the ring device 150 includes a structure 200 (or body) that has a receiving space 210 that provides a longitudinal access opening disposed on the underside of the structure 200 to allow at least ingress of a finger of a user, a first surface 212 (or internal surface) that can provide an engagement surface for a finger inserted through the receiving space 210 to wear the ring device 150, and a second surface 214 (or external surface). The structure 200 can also include one or more sensors and/or electronic components as described herein. In this example, the structure 200 includes a touchpad 204 for receiving touch inputs, a display 206 for displaying information from the ring device 150 and/or the XR system 100, and sensors 208. In some examples, the sensors 208 can include and/or can be the same as the IMU 152, the position sensor 154, the pressure sensor 156, and/or the touch sensor 158 shown in FIG. 1. In other examples, the sensors 208 can include one or more sensors and/or devices that are not shown in FIG. 1, such as one or more cameras, light sensors, audio sensors, lights, etc. In some cases, the ring device 150 can include a touch or pressure sensitive surface and/or surface portion for measuring touch inputs.

The receiving space 210 can be configured to receive a finger of a user. For example, as noted above, the receiving space 210 can include a longitudinal access opening disposed on the underside of the structure 200 to allow at least ingress of a finger of a user. The first surface 212 can provide an engagement or retention surface for the finger of the user. The first surface 212 can be contoured and/or shaped so as to support/retain the finger of the user within the receiving space 210 and inhibit or prevent movement of the finger in the longitudinal, lateral, and/or transverse axes/directions relative to the receiving space 210.

A longitudinal axis is generally parallel to the receiving space 210 and at least a portion of a finger wearing the ring device 150 (e.g., a finger retained by the first surface 212 of the structure 200). A lateral axis is normal to the longitudinal axis and a transverse axis extends normal to both the longitudinal and lateral axes. The longitudinal direction is a direction substantially parallel to the longitudinal axis, the lateral direction is a direction substantially parallel to the lateral axis, and the transverse direction is a direction substantially parallel to the transverse axis.

The second surface 214 can include an external surface of the structure 200. The external surface can include a top or upper surface of the structure 200. In some examples, a user wearing the ring device 150 on a finger can interact with the second surface 214 (e.g., using a different finger than the finger wearing the ring device 150 and/or using any other object) to provide inputs measured by the sensors/components (e.g., touchpad 204, display 206, sensors 208) on the structure 200. For example, a user can apply a force to a portion of the second surface 214 to provide an input measured by the sensors/components on the structure 200. In some examples, the user can touch, tap, squeeze, and/or apply pressure to the second surface 214 to provide an input (e.g., a touch input, a tap input, a squeeze/pressure input, etc.) that can be detected and measured by the touchpad 204, the display 206, and/or the sensors 208. In some examples, the user can provide a spinning or swiping force on the second surface 214 to generate an input (e.g., a spinning input, a swiping input, etc.) that can be detected and measured by the touchpad 204, the display 206, and/or the sensors 208. In some cases, the second surface 214 can include a touch or pressure sensitive surface and/or surface portion for measuring touch inputs.

In some cases, the receiving space 210 and/or the first surface 212 can be contoured and/or shaped to inhibit or prevent the structure 200 from rotating or spinning about a longitudinal axis of the user's finger and the receiving space 210 when the user applies a spinning or swiping force on the second surface 214. The touchpad 204, display 206, and/or sensors 208 can detect and measure the spinning or swiping force (e.g., a direction, magnitude, etc.) even if the structure 200 does not move or rotate (or movement or rotation of the structure 200 is substantially inhibited) in response to the spinning or swiping force. In other cases, the receiving space 210 and/or the first surface 212 can be contoured and/or shaped to allow the structure 200 to at least partly rotate/spin about a longitudinal axis of the user's finger and the receiving space 210 when the user applies a spinning or swiping force on the second surface 214. The touchpad 204, display 206, and/or sensors 208 can detect and measure the angular change, angular velocity, and/or angular acceleration of the structure 200 resulting from the spinning or swiping force.

In some examples, the ring device 150 can generate sensor measurements (e.g., via the touchpad 204 and/or sensors 208) and provide the sensor measurements to an electronic device (e.g., XR system 100, a mobile device, a television, a set-top box, any device with a user interface and/or any other electronic device) as inputs to an application on the electronic device. The sensor measurements can include measured interactions with the structure 200 and/or the second surface 214 (e.g., applied force/pressure, etc.), pose information about the structure 200, measured motion (e.g., rotation, velocity, acceleration, etc.), etc. The electronic device can interpret the sensor measurements into inputs to an application on the electronic device. In some examples, the ring device 150 can generate the sensor measurements and convert (e.g., process, interpret, map, etc.) the sensor measurements into inputs for an application running at the electronic device (e.g., XR system 100). The ring device 150 can use one or more processing devices of the ring device 150, such as an application-specific integrated circuit embedded in the structure 200, to convert the sensor measurements into inputs for a particular application. The ring device 150 can provide the inputs to the electronic device for processing by the particular application on the electronic device.

In some cases, the touchpad 204 and/or the sensors 208 can be used to generate a virtual spinning and/or rotating input by using one or more fingers to provide a force such as a spinning or swiping force. In some examples, the touchpad 204 and/or the sensors 208 can be used to generate a virtual spinning and/or rotating input by using one or more fingers to move the ring device 150 about a longitudinal axis of the receiving space 210. In some cases, the ring device 150 and/or a portion of the ring device 150 can rotate relative to the finger wearing the ring device 150, in response to a rotating force or gesture. In some examples, the sensors 208 can be used to provide a spinning and/or rotating input based on measurement movement of the ring device 150 about a longitudinal axis of the receiving space 210 and relative to the finger wearing the ring device 150.

In some examples, the ring device 150 can emit light using the display 206 and/or any light-emitting device (not shown) for detection by an electronic device with a camera, such as XR system 100. For example, the ring device 150 can emit light for detection by the electronic device. The electronic device can detect the light using one or more cameras and can use the light to determine motion of the ring device 150, such as rotation. In some examples, the ring device 150 can emit the light in response to a movement (e.g., rotation, etc.) above a threshold and/or a preconfigured interaction with the ring device 150 (e.g., with the second surface 214).

Figure 2B:
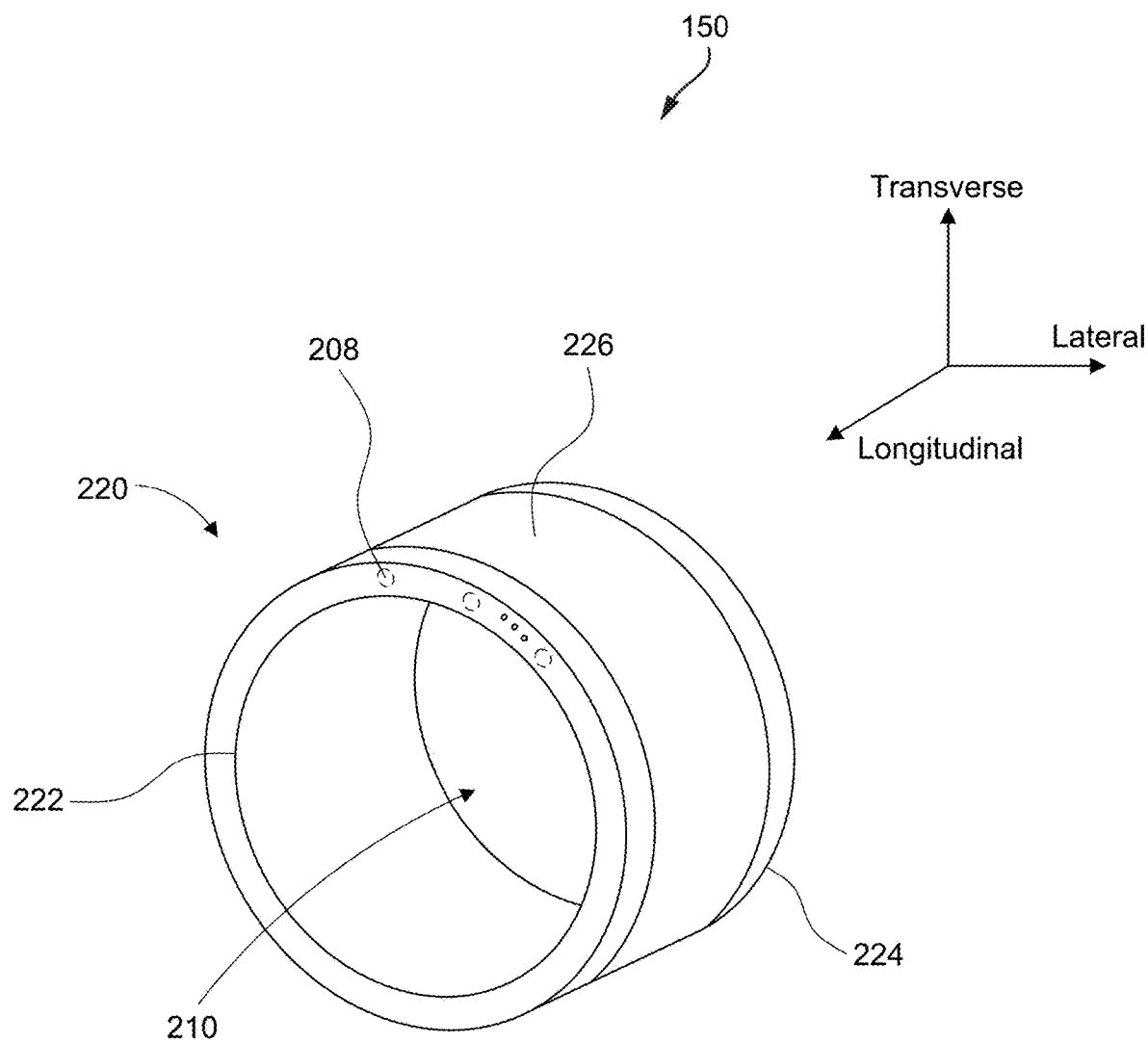

FIG. 2B illustrates another example of the ring device 150. In this example, the ring device 150 includes a structure 220 (or body) that has the receiving space 210 that provides a longitudinal access opening disposed on the underside of the structure 220 to allow at least ingress of a finger of a user, an engagement surface 222 that can engage a finger inserted through the receiving space 210 to wear the ring device 150, an upper surface 224, and a contact surface 226. The structure 220 can also include one or more sensors and/or electronic components as described herein. In some examples, the sensors 208 can include and/or can be the same as the IMU 152, the position sensor 154, the pressure sensor 156, and/or the touch sensor 158 shown in FIG. 1. In other examples, the sensors 208 can include one or more sensors and/or devices that are not shown in FIG. 1, such as one or more cameras, light sensors, audio sensors, lights, etc.

The receiving space 210 can be configured to receive a finger of a user. For example, as previously explained, the receiving space 210 can include a longitudinal access opening disposed on the underside of the structure 220 to allow at least ingress of a finger of a user. The engagement surface 222 can provide a surface for engagement or retention of the finger of the user. The engagement surface 222 can be contoured and/or shaped so as to support/retain the finger of the user within the receiving space 210 and inhibit or prevent movement of the finger in the longitudinal, lateral, and/or transverse axes/directions relative to the receiving space 210.

The upper surface 224 can include a top or partially external surface portion of the structure 220. The contact surface 226 can include another top or external surface portion of the structure 220. In some examples, the contact surface 226 (and/or a portion thereof) can be at least partially on top of and/or adjacent to the upper surface 224. In some cases, the contact surface 226 can be rotatably coupled to a portion of the upper surface 224. In some examples, the contact surface 226 can rotate about a longitudinal axis of the receiving space 210 and the upper surface 224. For example, the contact surface 226 can rotate relative to the upper surface 224 in a lateral direction from a longitudinal axis of the receiving space 210. The sensors 208 can measure the rotation (e.g., angular change, angular velocity, angular acceleration, etc.) and provide the measured rotation as input to an electronic device or convert the measured rotation into an input to an electronic device. In some cases, the contact surface 226 can include a touch or pressure sensitive surface and/or surface portion for measuring touch inputs.

In some examples, a user wearing the ring device 150 on a finger can interact with the contact surface 226 (e.g., using a different finger than the finger wearing the ring device 150 and/or using any other object) to provide inputs measured by the sensors 208 on the structure 220. For example, a user can apply a force to a portion of the contact surface 226 to provide an input measured by the sensors 208 on the structure 220. In some examples, the user can touch, tap, squeeze, and/or apply pressure to the contact surface 226 to provide an input (e.g., a touch input, a tap input, a squeeze/pressure input, etc.) that can be detected and measured by the sensors 208. In some examples, the user can provide a spinning or swiping force on the contact surface 226 to generate an input (e.g., a spinning input, a swiping input, etc.) that can be detected and measured by the sensors 208. In some examples, the user can rotate the contact surface 226 relative to the upper surface 224 (and about a longitudinal axis of the receiving space 210) to generate an input based on the rotation. The sensors 208 on the structure 220 can measure one or more properties of the rotation (e.g., angular change, angular velocity, angular rotation, etc.), which can be used as inputs and/or to generate inputs.

In some cases, the receiving space 210 and/or the engagement surface 222 can be contoured and/or shaped to inhibit or prevent the structure 220 from rotating or spinning about a longitudinal axis of the user's finger and the receiving space 210 when the user applies a spinning or swiping force on the upper surface 224. The sensors 208 can detect and measure the spinning or swiping force (e.g., a direction, magnitude, etc.) even if the structure 220 does not move or rotate (or movement or rotation of the structure 220 is substantially inhibited) in response to the spinning or swiping force. In other cases, the receiving space 210 and/or the engagement surface 222 can be contoured and/or shaped to allow the structure 220 and/or the contact surface 226 to at least partly rotate/spin about a longitudinal axis of the user's finger and the receiving space 210 when the user applies a spinning or swiping force on the contact surface 226. The sensors 208 can detect and measure the angular change, angular velocity, and/or angular acceleration of the structure 220 and/or the contact surface 226 resulting from the spinning or swiping force.

In some examples, the ring device 150 can generate sensor measurements (e.g., via the sensors 208) and provide the sensor measurements to an electronic device (e.g., XR system 100, a mobile device, a television, a set-top box, any device with a user interface and/or any other electronic device) as inputs to an application on the electronic device. The sensor measurements can include measured interactions with the structure 220 and/or the contact surface 226 (e.g., applied force/pressure, etc.), pose information about the structure 220, measured motion (e.g., rotation, velocity, acceleration, etc.), etc. The electronic device can interpret the sensor measurements into inputs to an application on the electronic device. In some examples, the ring device 150 can generate the sensor measurements and convert (e.g., process, interpret, map, etc.) the sensor measurements into inputs for an application running at the electronic device (e.g., XR system 100). The ring device 150 can use one or more processing devices of the ring device 150, such as an application-specific integrated circuit embedded in the structure 220, to convert the sensor measurements into inputs for a particular application. The ring device 150 can provide the inputs to the electronic device for processing by the particular application on the electronic device.

In some cases, the sensors 208 can be used to generate a virtual spinning and/or rotating input by using one or more fingers to provide a force such as a spinning or swiping force. In some examples, the sensors 208 can be used to generate a virtual spinning and/or rotating input by using one or more fingers to move the ring device 150 or the contact surface 226 about a longitudinal axis of the receiving space 210. In some cases, the ring device 150 and/or the contact surface 226 can rotate relative to the finger wearing the ring device 150, in response to a rotating force or gesture. In some examples, the sensors 208 can be used to provide a spinning and/or rotating input based on measured movement of the ring device 150 or the contact surface 226 about a longitudinal axis of the receiving space 210 and relative to the finger wearing the ring device 150.

In some examples, the ring device 150 can emit light using a light-emitting device (not shown) for detection by an electronic device with a camera, such as XR system 100. For example, the ring device 150 can emit light for detection by the electronic device. The electronic device can detect the light using one or more cameras and can use the light to determine motion of the ring device 150, such as rotation. In some examples, the ring device 150 can emit the light in response to a movement (e.g., rotation, etc.) above a threshold and/or a preconfigured interaction with the ring device 150 (e.g., with the contact surface 226).

Figure 2C:
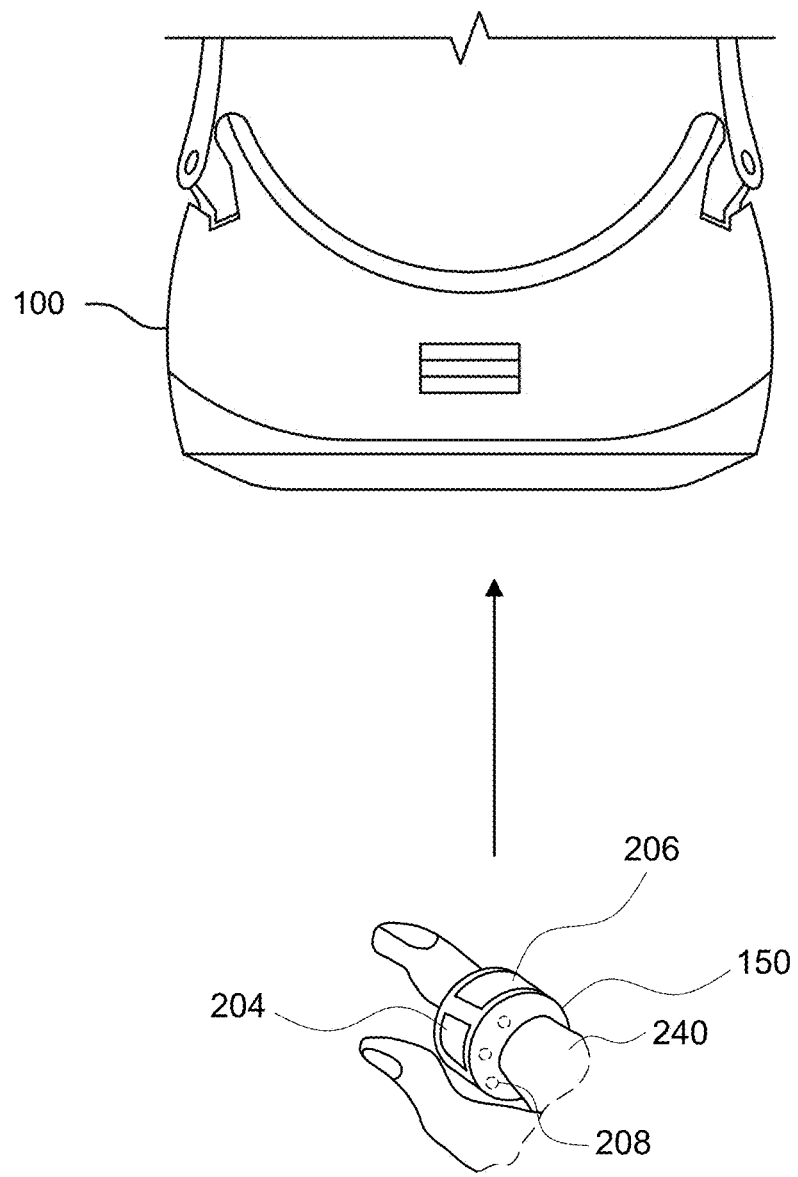
FIG. 2C illustrates an example of a ring device worn on a finger of a user interacting with an extended reality system, in accordance with some examples of the present disclosure.

FIG. 2C illustrates an example of the ring device 150 worn on a finger 240 of a user interacting with the XR system 100. In this example, the ring device 150 is used to interact with (e.g., provide inputs, etc.) the XR system 100. However, the XR system 100 is shown as a non-limiting example for explanation purposes. In other examples, the ring device 150 can be used to interact with other electronic devices (e.g., mobile devices, televisions, smart wearable devices, any electronic device with a user interface, etc.).

The user can use the ring device 150 to interact with the XR system 100 and provide various types of XR inputs as further described herein. In some examples, the ring device 150 can collect sensor measurements to track a location and/or pose of the ring device 150 in 3D space. In some examples, the location and/or pose can be tracked relative to a location and/or pose of the XR system 100 in 3D space.

In the example shown in FIG. 2, the ring device 150 includes a touchpad 204 for receiving touch inputs, a display 206 for displaying information from the ring device 150 and/or the XR system 100, and sensors 208. In some examples, the sensors 208 can include and/or can be the same as the IMU 152, the position sensor 154, the pressure sensor 156, and/or the touch sensor 158 shown in FIG. 1. In other examples, the sensors 208 can include one or more sensors and/or devices that are not shown in FIG. 1, such as one or more cameras, light sensors, gyroscopes that are separate from a gyroscope of the IMU, accelerometers that are separate from an accelerometer of the IMU, magnetometers that are separate from a magnetometer of the IMU, audio sensors, lights or light emitting devices, transmitters, ultrasonic transmitters/transducers, etc. In some cases, the ring device 150 can include a touch or pressure sensitive surface and/or surface portion for measuring touch inputs.

In some cases, the touchpad 204 and/or the sensors 208 can be used to generate one or more measurements based on detected motion of the ring device 150, interactions with the ring device 150 (e.g., force/pressure/touch/rotation/etc.), a detected pose of the ring device 150, etc. In some cases, the ring device 150 can send such measurements to the XR system 100 as inputs to the XR system 100 (e.g., input to an XR application on the XR system 100). In some cases, the ring device 150 can convert/interpret (e.g., via an ASIC or any other processing device) the one or more measurements to one or more inputs on a user interface and/or XR application at the XR system 100, and send the one or more inputs to the XR system 100. In some cases, the touchpad 204 and/or the sensors 208 can be used to generate a virtual spinning and/or rotating input by using one or more fingers to provide a force such as a spinning or swiping force. In some examples, the touchpad 204 and/or the sensors 208 can be used to generate a virtual spinning and/or rotating input by using one or more fingers to move the ring device 150 about a longitudinal axis of the ring lumen (e.g., receiving space 210) while the ring device 150 remains substantially stationary relative to the finger 240. In some cases, the ring device 150 and/or a portion of the ring device 150 can rotate relative to the finger 240 in response to a rotating force or gesture. In some examples, the sensors 208 can be used to provide a spinning and/or rotating input by moving the ring device 150 about a longitudinal axis of the ring lumen and relative to the finger 240.

The XR system 100 can render content, interfaces, and/or controls to a user wearing the XR system 100. The user can use the ring device 150 to wirelessly interact with the content, interfaces, and/or controls and provide various types of inputs such as selections, object/environment manipulations, navigation inputs (e.g., scrolling, moving, etc.), gestures, etc. Non-limiting examples of interactions with content, interfaces, and/or controls rendered by the XR system 100 using the ring device 150 can include item scrolling in any kind of list and/or inventory of options, text scrolling in an object and/or rendered content item (e.g., a browser, a document, an interface, etc.), navigating to a different location and/or page, a data entry (e.g., a text and/or numerical entry, etc.), object and/or environment manipulation (e.g., object and/or environment rotation, translation, placement, and/or scaling), selection events, virtual space creation and/or manipulation, content scrolling, multimedia controls (e.g., start, stop, pause, etc.), physical world measurements, tracking and/or localization inputs and/or calibrations, etc.

The ring device 150 can provide privacy with respect to inputs, interactions, and/or associated data. For example, inputs can be provided via the ring device 150 discreetly and/or hidden from a field-of-view of a nearby device and/or person to avoid detection and/or recognition. Moreover, inputs can be provided via the ring device 150 while in space-constrained environments (e.g., tight spaces), while lying down and/or while a user is otherwise unable to provide (and/or has difficulty providing) inputs requiring additional and/or larger ranges of body (e.g., hand, arm, etc.) motion. For example, a user can provide inputs via the ring device 150 without waving a hand(s) and/or finger(s) in the air and/or away from the user's body. Moreover, in many cases, inputs provided via the ring device 150 can be easier and/or more intuitive. For example, the input gesture can mimic the type of input provided to the XR system 100 (e.g., rotating the ring device 150 to scroll, tapping the ring device 150 to select, etc.). In some cases, the ring device 150 can conserve power on the XR system 100 by power down or off (or providing information used to power down or off) tracking sensors on the XR system 100, such as image sensors.

Figure 3A:
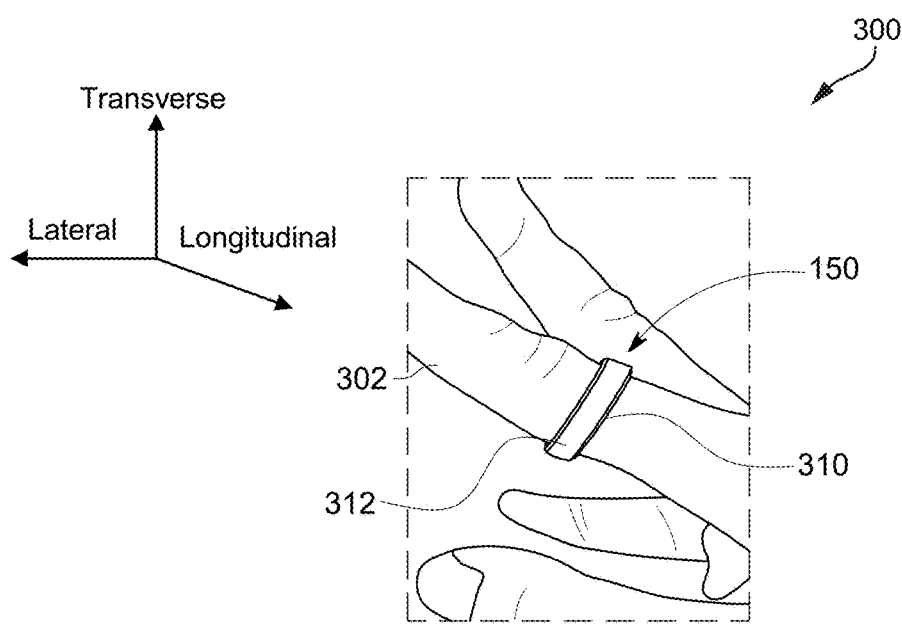
FIG. 3A is a diagram illustrating an example configuration of a ring device, in accordance with some examples of the present disclosure.

FIG. 3A illustrates an example configuration 300 of a ring device 150. In this example, the ring device 150 includes an inner ring portion 310 (e.g., upper surface 224 shown in FIG. 2B) and an outer ring portion 312 (e.g., contact surface 226 shown in FIG. 2B). The inner ring portion 310 can receive/engage a finger 302 of a user as shown in FIG. 3A. In some examples, the outer ring portion 312 (and/or a portion thereof) can be at least partially on top of and/or adjacent to the inner ring portion 310. In some cases, the outer ring portion 312 (and/or a portion thereof) can encompass (and/or rotate) a greater distance along a lateral axis from a longitudinal axis of the lumen of the ring device 150 and at least a portion of the finger 302. In some examples, the inner ring portion 310 and the outer ring portion 312 can be asymmetric. In some cases, the outer ring portion 312 can be rotatably coupled to a portion of the upper surface 224. The outer ring portion 312 can spin/rotate relative to the inner ring portion 310 and around a longitudinal axis of the lumen of the ring device 150. The outer ring portion 312 can spin/rotate relative to the inner ring portion 310 in response to a force applied to the outer ring portion 312, such as a swiping force.

In some examples, the outer ring portion 312 can do a full rotation (e.g., 360 degrees) relative to the inner ring portion 310 and around a longitudinal axis of the lumen of the ring device 150. In other examples, the outer ring portion 312 can do a partial rotation (e.g., less than 360 degrees) relative to the inner ring portion 310 and around a longitudinal axis of the lumen of the ring device 150. In some cases, the amount of rotation can depend on the amount of rotational force/pressure (e.g., the magnitude and/or continuity) applied to the outer ring portion 312. For example, a user can apply a higher magnitude of force/pressure to the outer ring portion 312 to increase the amount of rotation performed by the outer ring portion 312. As another example, a user can apply a lower magnitude but continuous force/pressure to the outer ring portion 312 to increase the amount of rotation. Similarly, the user can decrease the amount of rotation by decreasing the amount (e.g., magnitude and/or continuity) of force/pressure applied to the outer ring portion 312.

When the outer ring portion 312 is rotated, a position sensor (e.g., position sensor 154) on the ring device 150 can determine the relative motion between the inner ring portion 310 and the outer ring portion 312. The position sensor can determine the magnitude of the rotation, the direction of the rotation, and/or the velocity of the rotation. The ring device 150 can provide rotation information to the XR system 100, which the XR system 100 can convert (e.g., interpret) into a particular XR input. In some cases, the XR input can correspond to the detection of relative motion. In some cases, the XR input can depend on more granular motion information such as the magnitude of rotation, the direction of rotation, and/or the velocity of rotation, as previously explained. For example, different directions of rotation can be converted (e.g., interpreted) into different XR inputs or types of XR input. To illustrate, a rotation in one direction can convert (can be interpreted as) to scrolling in a particular direction and a rotation in a different direction can convert to scrolling in a different direction. In some cases, rotation in one direction can be converted (e.g., interpreted as) to a type of XR input such as scrolling, while rotation in another direction can be converted to a different type of XR input such as a selection event, a different navigation event, etc.

As another example, different magnitudes of rotation (e.g., degrees) and/or velocities can convert into different XR inputs and/or different types of XR inputs. To illustrate, a rotation having a threshold magnitude and/or velocity can be converted into an autoscrolling or smooth scrolling event, and a rotation having a magnitude and/or velocity below a threshold can be converted into (e.g., interpreted as, mapped to, etc.) a certain magnitude of scrolling. In some cases, a rotation having a threshold magnitude and/or velocity can be converted into particular type of XR input, such as scrolling, while a rotation having a magnitude and/or velocity below a threshold can be converted into a different type of XR input, such as a selection event.

In some implementations, the XR system 100 can maintain definitions of rotation events and/or parameters, which the XR system 100 can use to convert a rotation event into an XR input. For example, the XR system 100 can map one or more magnitudes, velocities, and/or directions of rotation to one or more XR inputs and/or types of XR inputs. The XR system 100 can use such mapping to convert rotation information received from the ring device 150 into a particular XR input. In some cases, the XR system 100 can map specific magnitudes and/or velocities or specific ranges of magnitudes and/or velocities to specific XR inputs and/or types of XR inputs.

In some examples, the user can use a finger to rotate the outer ring portion 312 relative to the inner ring portion 310. For example, with reference to FIG. 3B, the user can use a different finger 304 to rotate the outer ring portion 312 while the ring device 150 is worn on the finger 302. In the example shown in FIG. 3B, the different finger 304 is a thumb on the same hand as the finger 302 on which the ring device 150 is worn. However, the user can rotate the outer ring portion 312 with any finger or combination of fingers on the same or different hand as the finger 302 wearing the ring device 150. In some cases, the user can rotate the outer ring portion 312 without use of another finger. For example, in some cases, the user can rotate the outer ring portion 312 by swiping the outer ring portion 312 with a surface (e.g., a leg, a couch, a seat/chair, a table, a floor, etc.) or pressing the ring device 150 onto a surface while moving the finger 302 along the surface. To illustrate, the user can press the ring device 150 against the user's leg and move the finger 302 a certain amount along the leg to cause the outer ring portion 312 to rotate a certain amount.

In some cases, the entire ring device 150 can be rotated relative to the finger wearing the ring device 150 and about a longitudinal axis of the ring device's lumen. For example, in some cases, the ring device 150 may rotate relative to the finger and a position sensor can detect the rotation (and/or the magnitude, velocity, and/or direction of the rotation) of the ring device 150. The ring device 150 can also be configured to detect inputs based on one or more other types of motion, force, and/or interactions. FIGS. 4A through 4D illustrate example use cases for providing inputs using the ring device 150.

Figure 4A:
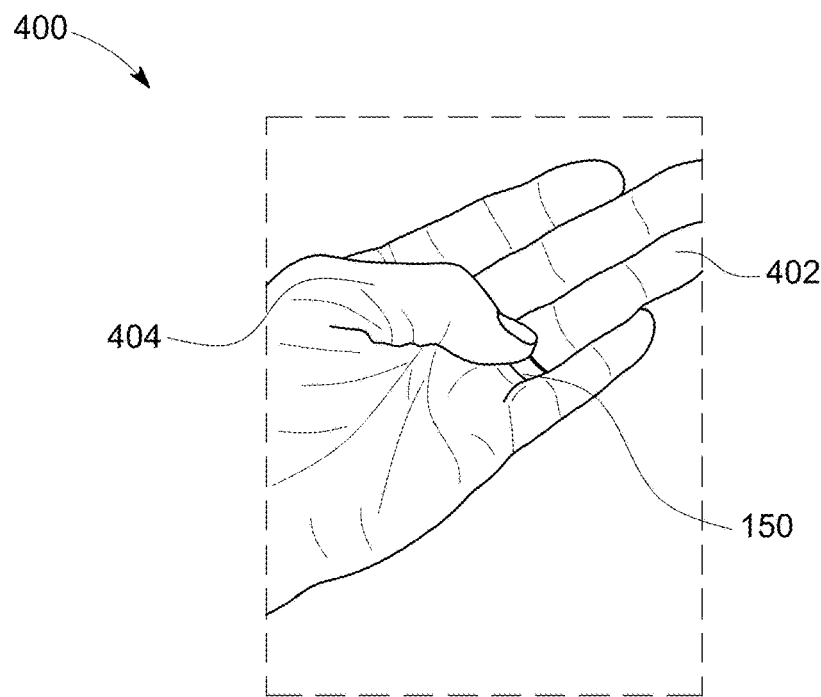
FIGS. 4A-D are diagrams illustrating example use cases for providing extended reality inputs using a ring device, in accordance with some examples of the present disclosure.

FIG. 4A illustrates an example use case 400 for providing an input to the XR system 100 via the ring device 150. In this example, the user can tap a surface of the ring device 150 to provide an input to the XR system 100. For example, the user can wear the ring device 150 on finger 402 and use a different finger 404 to tap a surface of the ring device 150. The different finger 404 in this example is a thumb on the same hand as the finger 402 on which the ring device 150 is worn. However, the user can tap a surface of the ring device 150 with any finger or combination of fingers on the same or different hand as the finger 402 wearing the ring device 150. In some cases, the user can also tap a surface of the ring device 150 using a different object or surface, such as a leg (e.g., by tapping the ring device 150 against the leg), a couch, a seat/chair, a table, a floor, etc.).

A position sensor (e.g., position sensor 154) on the ring device 150 can detect the tapping and/or one or more characteristics of the tapping such as a magnitude or length of time of the tapping. The ring device 150 can provide information about the tapping to the XR system 100, which can convert the tapping information into an XR input.

Figure 4B:
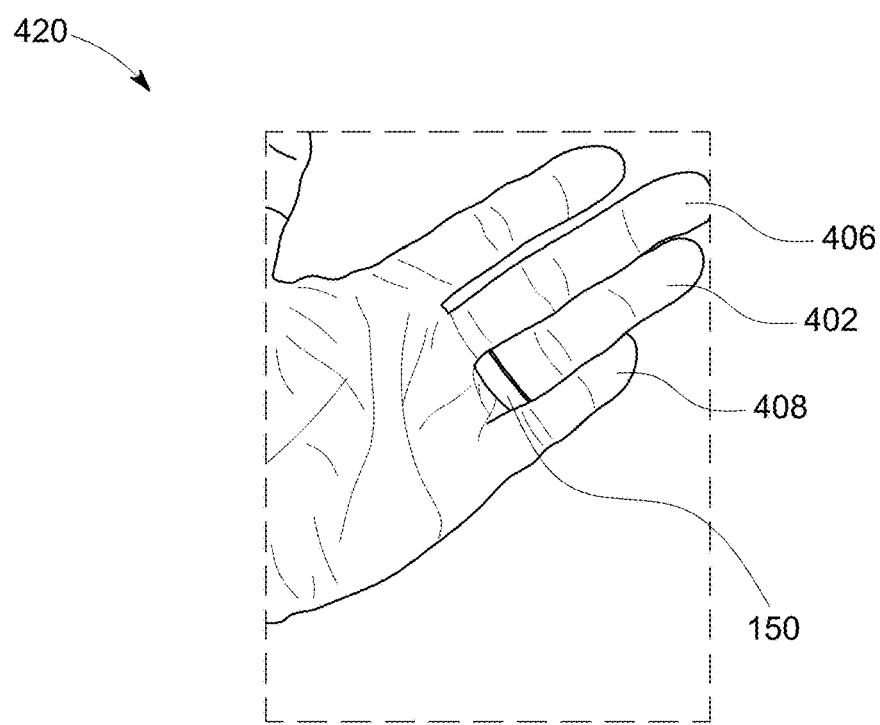

In some cases, the tapping (and/or a characteristic of tapping such as a magnitude or length of time) can be mapped to one or more XR inputs. For example, the tapping, the magnitude of tapping, and/or a length of time of the tap can be mapped to an XR input event, an input function in a virtual user interface, etc. In some cases, different magnitudes of tapping and/or different lengths of time of tapping can be mapped to different XR inputs and/or XR input types. For example, a tap of a threshold magnitude can be mapped to an XR input, such as a double click, and a tap below the threshold magnitude can be mapped to a different XR input, such as a single click. As another example, a tap where the length of time of the force applied on a surface of the ring device 150 is below a threshold can be mapped to an XR input while a longer tap where the length of time of the force applied on the surface of the ring device 150 is above a threshold can be mapped to a different XR input. In some cases, one or more patterns of taps can be converted into one or more XR inputs. For example, a certain sequence of taps can be mapped to one or more XR inputs and a different sequence of taps can be mapped to one or more different XR inputs. FIG. 4B illustrates another example use case 420 for providing an input to the XR system 100 via the ring device 150. In this example, the user is wearing the ring device 150 on finger 402, providing an input by squeezing the ring device 150 with adjacent finger 406 and adjacent finger 408. A touch sensor (e.g., touch sensor 158) on the ring device 150 can detect the squeezing and/or determine the magnitude and/or the length of time of the squeezing. The ring device 150 can provide the squeezing information to the XR system 100, which can convert the squeezing information into an XR input.

In some examples, the squeezing, the magnitude of squeezing, and/or the length of time of the squeezing can be mapped to one or more XR inputs. In some cases, different magnitudes and/or lengths of time of squeezing can be mapped to different XR inputs and/or XR input types. For example, a prolonged squeeze (e.g., above a threshold amount of time) can be mapped to a particular XR input, such as a double click, and a shorter squeeze (e.g., below a threshold amount of time) can be mapped to a different XR input, such as a single click. As another example, a harder squeeze (e.g., above a threshold amount of force/pressure) can be mapped to a particular XR input, and a softer squeeze (e.g., below a threshold amount of force/pressure) can be mapped to a different XR input.

Figure 3B:
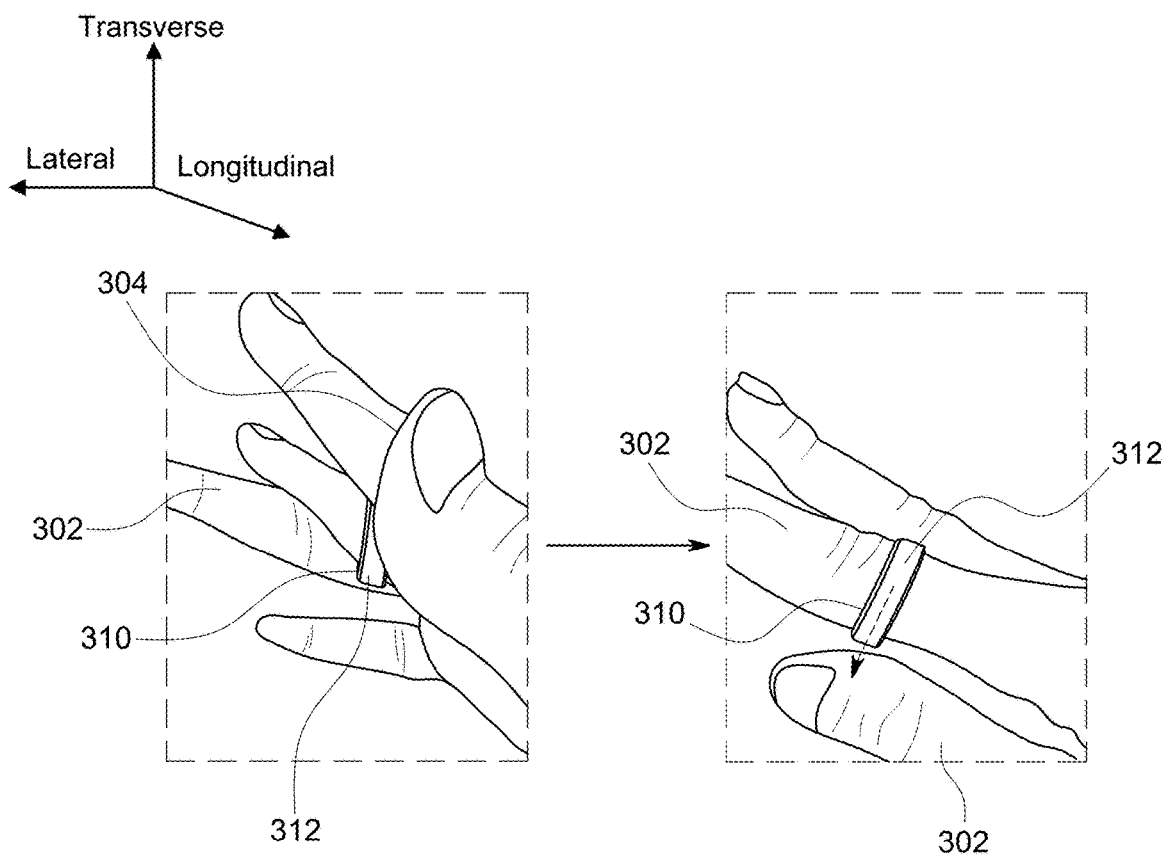
FIG. 3B is a diagram illustrating an example use case for using the example ring device shown in FIG. 3A, in accordance with some examples of the present disclosure.
Figure 4C:
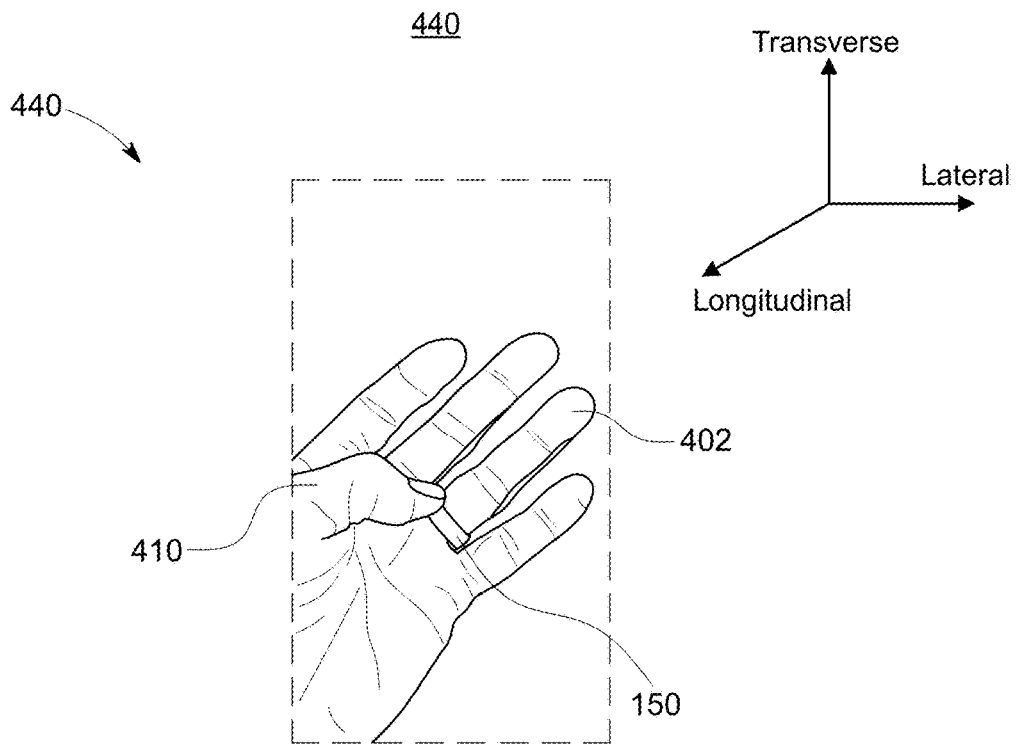

FIG. 4C illustrates an example use case 440 of a ring device 150 being rotated relative to a finger 402 wearing the ring device 150 and about a longitudinal axis of a lumen (e.g., receiving space 210) of the ring device 150. In this example, the ring device 150 does not include an outer ring portion and an inner ring portion as shown in FIGS. 3A and 3B. The user can use a different finger 410 to rotate the entire ring device 150 around at least part of the finger 402 wearing the ring device 150 and about a longitudinal axis of the lumen of the ring device 150. In some examples, the user can rotate the ring device 150 about the longitudinal axis of the lumen in a lateral direction from the longitudinal axis of the lumen. The different finger 410 in this example is a thumb on the same hand as the finger 402 on which the ring device 150 is worn. However, the user can rotate the ring device 150 with any finger or combination of fingers on the same or different hand as the finger 402 wearing the ring device 150.

When the different finger 410 rotates the ring device 150, a position sensor (e.g., position sensor 154) on the ring device 150 can determine the magnitude, velocity, and/or direction of rotation of the ring device 150 about the longitudinal axis of the lumen of the ring device 150. The ring device 150 can provide such rotation information to the XR system 100, and the XR system 100 can convert the rotation information into a particular XR input, as previously explained.

Figure 4D:
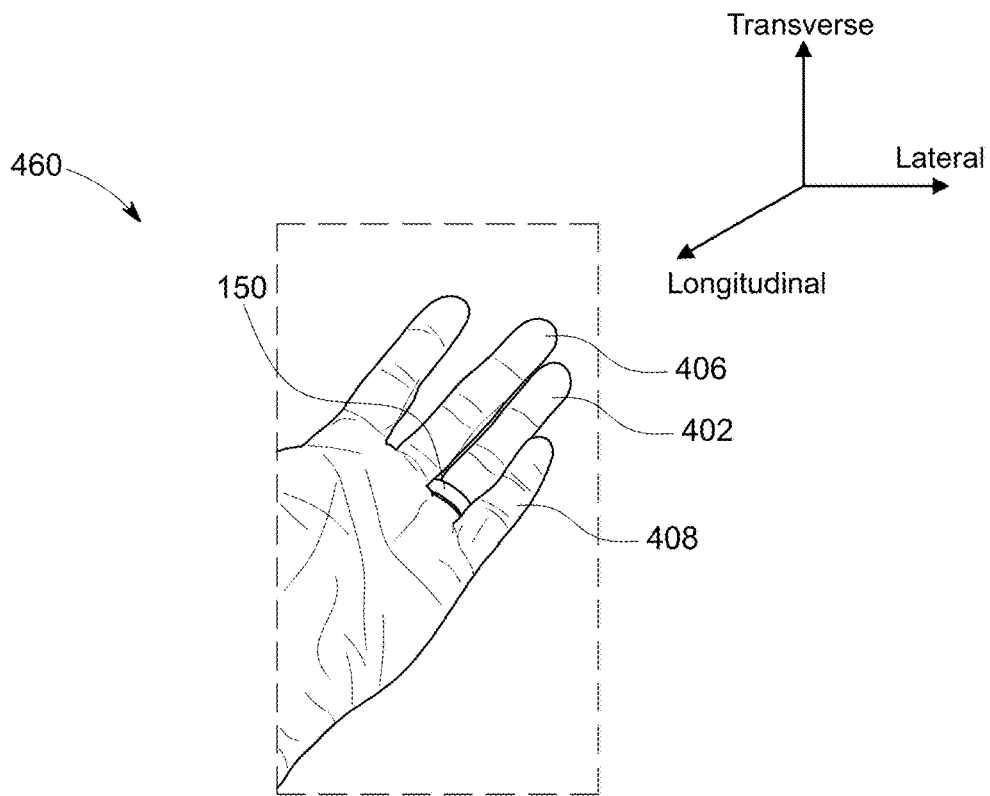

FIG. 4D illustrates an example use case 460 for rotating the ring device 150 using adjacent fingers. In this example, the user can use adjacent finger 406 and/or adjacent finger 408 to rotate the ring device 150 relative to the finger 402 wearing the ring device 150 and about a longitudinal axis of the lumen of the ring device 150. For example, the user can rotate the ring device 150 about a longitudinal axis of the lumen in a lateral direction from the longitudinal axis. The user can use the adjacent finger 406 and/or adjacent finger 408 to rotate or swipe the ring device 150 in a particular direction. A position sensor on the ring device 150 can detect the rotation and provide rotation information to the XR system 100. The XR system 100 can convert the rotation information into one or more XR inputs. The XR system 100 can use one or more definitions mapping XR inputs to rotation events, as previously explained.

In some examples, the ring device 150 can shown in FIGS. 4A-D can be used to provide other inputs and/or data in addition to and/or instead of the XR inputs corresponding to the use cases 400, 420, 440, and 460 described above. For example, the ring device 150 can emit a light or blink to provide certain information to the XR system 100. The XR system 100 can detect the light/blinking using one or more image sensors, and can use the light/blinking as an input and/or to supplement other inputs. In some examples, the XR system 100 can use the detected light/blinking to track/estimate a location and/or motion (e.g., rotation) of the ring device 150. In other examples, the XR system 100 can interpret and/or convert the detected light/blinking to an instruction to perform a certain action, such as adjust a state of one or more components of the XR system 100 (e.g., a power mode of one or more components (turn on, turn off, increase a power mode, decrease a power mode, etc.), a processing performed by the XR system 100, etc.), trigger an action by the XR system 100 (e.g., render an object and/or interface, start or stop an operation, press or activate a button on the XR system 100, etc.), process an input to a user interface at the XR system 100, supplement an input based on an interaction with the ring device 150 (e.g., force/pressure, etc.).

In other examples, the ring device 150 can detect audio (e.g., via one or more audio sensors), such as a speech or voice input, and provide the audio to the XR system 100 and/or an input instruction generated from the audio). The XR system 100 can use audio from the ring device 150 to perform a certain action at the XR system 100, as previously described. In some cases, the ring device 150 can be used to generate any other type of input to the XR system 100. For example, in some cases, the ring device 150 can be used to generate a hand gesture (e.g., a fist, a flat palm, pointing a finger/hand, a hand motion, a hand signal, etc.). The hand gesture can be determined by one or more sensors on the XR system 100 and used to perform a certain action at the XR system 100, as previously described. In some examples, the determination of the hand gesture can be aided by data from one or more sensors on the ring device 150, such as an IMU, a pressure sensor, etc.

Figure 5:
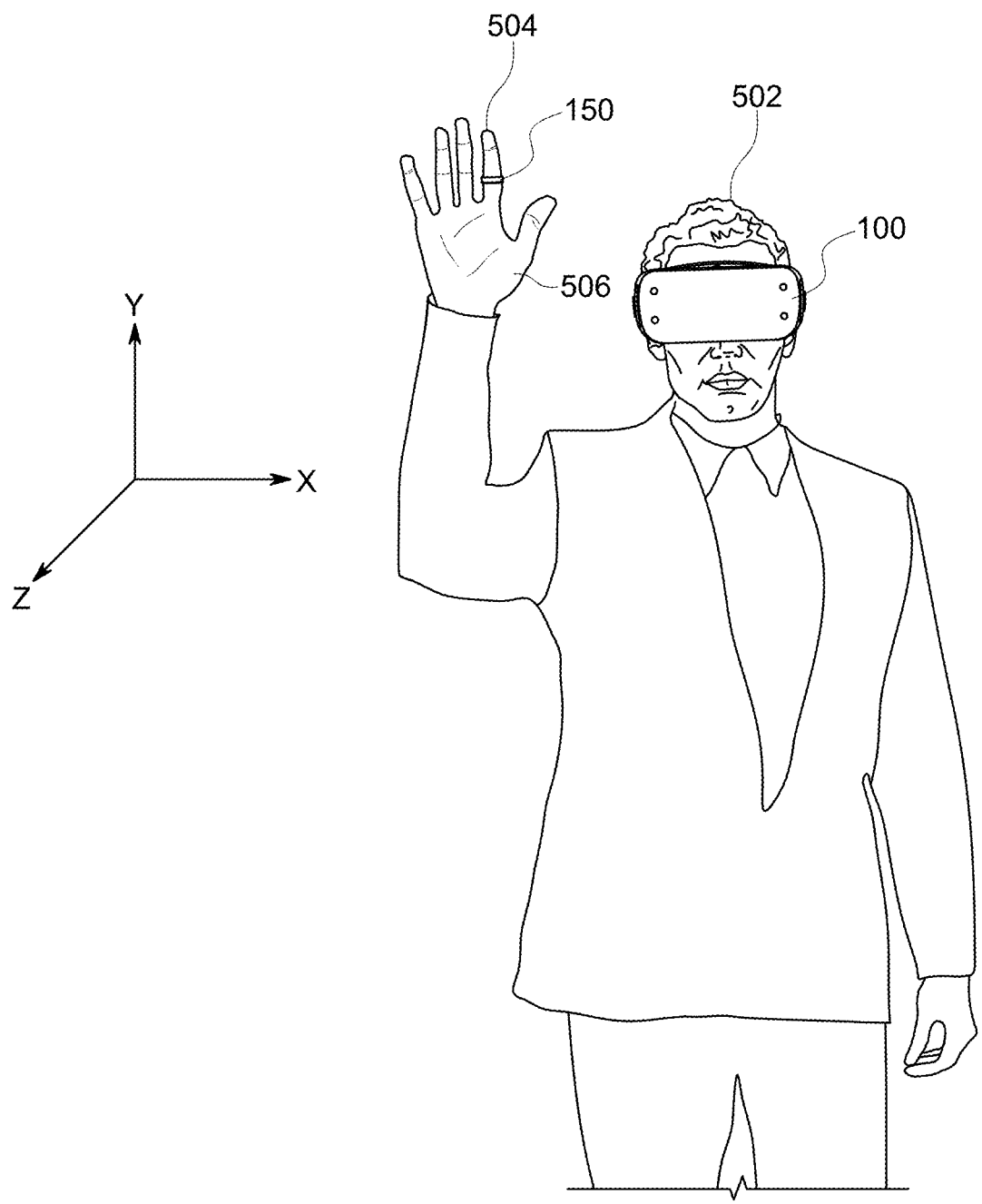
FIG. 5 is a diagram illustrating an example of a user providing extended reality inputs by moving and/or positioning a hand and/or finger wearing a ring device, in accordance with some examples of the present disclosure.

FIG. 5 illustrates an example of a user 502 providing XR inputs by moving and/or positioning a hand 506 and/or finger 504 wearing the ring device 150. The user 502 can move the hand 506 and/or finger 504 in any direction in 3D space to generate one or more XR inputs via the ring device 150. The movement and/or position of the hand 506 and/or finger 504 can be converted into one or more XR inputs. In some cases, the movement of the hand 506 and/or finger 504 can be converted into one or more XR inputs based on a direction of movement, a magnitude of movement, a velocity of the movement, a pattern and/or sequence of the movement, a gesture associated with the movement, and/or any other characteristics of the movement.

As previously explained, the ring device 150 can implement sensors (e.g., IMU 152, position sensor 154, pressure sensor 156) that can measure characteristics of the movement. For example, the sensors on the ring device 150 can estimate the orientation of the finger 504 and/or hand 506 in 3D space, a movement of the ring device 150, a gesture associated with the finger 504 and/or hand 506, a position of the finger 504 and/or hand 506, etc. This information can be converted into one or more XR inputs. In some cases, this information can be converted into a manipulation of a virtual environment, interface, and/or object(s) presented by the XR system 100.

For example, in some cases, the sensor information from the ring device 150 can be used to track the hand 506 of the user 502. The hand tracking can be used to detect a hand gesture and trigger an object manipulation event. The ring device 150 can provide the sensor information to the XR system 100, which can convert the sensor information into an object manipulation, such as moving an object, rotating an object, resizing an object, setting a plane associated with an object and/or environment, etc.

As another example, the sensors in the ring device 150 can detect motion information (e.g., velocity, changes in acceleration, etc.) and provide the motion information to the XR system 100. The motion (e.g., velocity, changes in acceleration, etc.) reflected in the motion information can trigger certain events. The XR system 100 can convert the motion information and implement the triggered events. To illustrate, if the user 502 moves the hand 506 at a velocity and/or an acceleration above a threshold, the movement of the hand 506 can be converted into an event such as, for example, placing an object on a plane in 3D space and/or the virtual environment. In another example, the sensors in the ring device 150 can detect an orientation of the ring device 150 provide the orientation information to the XR system 100 with or without other information such as rotation information (e.g., rotational velocity, rotational acceleration, rotation angle, etc.). The orientation reflected in the orientation information can trigger certain events (e.g., with or without the other information such as the rotation information). The XR system 100 can convert the orientation information (with or without other information such as the rotation information) and implement the triggered events.

In some examples, the ring device 150 can use one or more sensors, such as ultrasonic transmitters/transducers and/or microphones, for ranging of the hand 506. The ranging of the hand 506 can be used to determine one or more XR inputs. For example, in some cases, ranging information can be used to resize objects with certain pinch gestures (e.g., one or more pinch gestures that gesture grabbing one or more edges of an object). In some cases, the ranging information (and/or other hand tracking information) associated with one or more ring devices can be used to implement resizing events based on certain gestures. For example, instead of finding and pinching the corners of an object, the user 502 can make a symbolic gesture with the user's hands for "resizing". In some examples, the symbolic gesture can include a movement or gesture of one or more hands that mimics a motion used to resize an object, mimics a motion to define one or more boundaries/dimensions of an object, matches a preconfigured motion or gesture for resizing objects, etc. In some examples, a measurement of the distance between a ring device on each hand can then be used to affect the resizing of that object.

The ring device 150 can also be used to measure distances in the environment even when the ring device 150 is out of a field-of-view (FOV) of the XR system 100 or when the lighting levels in the environment are too low for the XR system 100 to sufficiently detect the ring device 150. For example, the user 502 can put down the hand 506 with the ring device 150 to trigger the ring device 150 to measure one or more distances in the physical world in an XR application, such as an XR measuring tape application for example. In some examples, the one or more distances to measure can be defined by a movement of the hand 506 with the ring device 150. For example, the user 502 can move the hand 506 with the ring device 150 from a first position to a second position to define a distance to be measured and/or initiate the start and end of the distance measurement. In some cases, the ring device 150 can use sensors, such as one or more ultrasonic transmitters/transducers and/or microphones, to determine if the user's hands are closer together or farther apart, if any of the user's hands are close to one or more objects, etc.

In some examples, the ring device can use a pressure sensor, such as a barometric air pressure sensor, to determine relative changes in the position of the hand 506. The XR system 100 can interpret such changes and/or position into XR inputs, such as selection events.

In some cases, the ring device 150 can use one or more sensors to obtain hand tracking information, which the XR system 100 can use to track the hands and/or estimate a location of the hands even if the hands are out of the FOV of the XR system 100 and/or the lighting is too low for the image sensor at the XR system 100 to detect the hands. For example, if the user's hands move from up to down while outside of the FOV of the XR system 100, the XR system 100 can still obtain an estimate of such motion. In some cases, the XR system 100 can implement a synthetic animation representing such motion even though such motion occurred outside of the FOV of the XR system 100.

In some examples, the XR system 100 can determine XR inputs based on a combination of motion/position information from the ring device 150 and interactions with the ring device 150. For example, the ring device 150 can send to the XR system 100 sensor measurements of a hand position and a rotation (e.g., angle, rotational velocity, and/or rotational acceleration) of the ring device 150. The XR system 100 can use the combination of the hand position and the rotation (e.g., the angle, rotational velocity, and/or rotational acceleration) of the ring device 150 to enable vertical and horizontal adjustments of virtual objects and/or environments. To illustrate, the user can create a plane in space using the hand with the ring device 150. The user can then adjust the height and depth of that plane by a spin or scroll action of the ring device 150. The hand orientation reported by the ring device 150 (e.g., vertical and/or horizontal) can determine which component (e.g., height or depth) the user is modifying.

As another example, the user can setup a virtual space, such as a virtual office, by "setting" anchor planes based on the hand position measured based on sensor data from the ring device 150. The user can scroll through different content elements to position one or more content elements (e.g., a TV screen, weather widget, TV monitor, game, etc.) on one or more anchor planes. The user can also use the ring device 150 to provide content scrolling and multimedia controls (e.g., start, stop, pause, etc.). For example, if the user has a media application, such as a music application or a video application, the user can start, stop, pause, rewind, forward, and/or otherwise control a content playback on the media application without moving the user's hands. The user can instead control the media application by interacting with the ring device 150, such as applying pressure to the ring device 150, rotating the ring device 150, etc.

FIG. 6 is a flowchart illustrating an example process 600 for using a ring device (e.g., ring device 150) to enhance user interface, input, and/or XR functionalities. At block 602, the process 600 can include detecting, by a wearable device (e.g., ring device 150), movement of the wearable device and/or a force applied to a surface(s) of the wearable device. In some examples, the wearable device can include a structure defining a receiving space or lumen (e.g., receiving space 210) configured to receive a finger associated with a user. In some examples, the structure can include a first surface configured to contact the finger received via the receiving space. In some examples, the receiving space can include a longitudinal access opening for receiving the finger, and the first surface can be countered or shaped to inhibit or prevent a movement of the finger along a longitudinal, lateral, and/or transverse direction.

At block 604, the process 600 can include determining, by the wearable device from one or more sensors on the wearable device, one or more measurements of the movement of the wearable device and/or the force applied to the surface(s) of the wearable device. In some examples, the one or more sensors are integrated into the structure associated with the wearable device. In some examples, the one or more measurements can include a rotation of at least a portion of the wearable device about a longitudinal axis of the receiving space associated with the wearable device. In some cases, the one or more sensors can be configured to detect the rotation of at least a portion of the wearable device about the longitudinal axis of the receiving space. In some cases, the one or more measurements can include a first rotational measurement (e.g., angular change, angular/rotational velocity, angular/rotational acceleration, etc.) associated with a first rotation of the structure about the longitudinal axis of the receiving space of the wearable device and/or a second rotational measurement (e.g., angular change, angular/rotational velocity, angular/rotational acceleration, etc.) associated with a second rotation of a portion of the structure about the longitudinal axis of the receiving space. The first rotation and the second rotation can be relative to the finger contacting the first surface of the wearable device.

At block 606, the process 600 can include sending, by the wearable device via a wireless transmitter, to an electronic device (e.g., XR system 100), data associated with the one or more measurements. In some examples, the wearable device can send the one or more measurements of the movement to the electronic device. The one or more measurements can represent and/or correspond to an XR input at the electronic device.

In some aspects, the process 600 can include sending, by the wearable device to the electronic device, an XR input associated with an XR application at the electronic device. In some examples, the XR input can be based on one or more measurements from the one or more sensors. For example, the XR input can include the first rotational acceleration and/or the second rotational acceleration.

In some examples, the one or more measurements of the movement include one or more rotational measurements, and the one or more rotational measurements include at least one of a rotational angle, a rotational velocity, and/or a rotational acceleration.

In some examples, the one or more sensors are configured to detect at least one of a touch signal corresponding to one or more fingers contacting a second surface of the structure, an orientation of the structure, and/or a position of the structure relative to one or more objects. In some cases, the data can include at least one of a magnitude of the touch signal, the orientation of the structure, the position of the structure relative to the one or more objects, and/or a distance between the structure and at least one of the electronic device directly or indirectly coupled to the wearable device and/or a different hand than a respective hand of the finger.

In some aspects, the one or more sensors can be configured to detect a touch signal corresponding to one or more fingers contacting a different surface of the structure, an orientation of the structure, and/or a position of the structure relative to one or more objects. In some cases, the one or more measurements can include a magnitude of the touch signal, the orientation of the structure, the position of the structure relative to the one or more objects, and/or a distance between the structure and the electronic device and/or a different hand than a respective hand of the finger. In some examples, the one or more measurements correspond to an additional orientation of the respective hand of the finger, and the XR input is based on the additional orientation of the respective hand and at least one of the rotation and/or the orientation of the structure.

In some examples, detecting the movement can include detecting a rotation of at least a portion of the structure about a longitudinal axis of the receiving space and measuring at least one of a first rotation of a first portion of the structure (e.g., upper surface 224) about the longitudinal axis of the receiving space and a second rotation of a second portion of the structure (e.g., contact surface 226) about the longitudinal axis of the receiving space. In some examples, the second rotation is in a direction opposite to the first rotation.

In some aspects, the process 600 can include sending, by the wearable device to the electronic device, one or more additional measurements from the one or more sensors. In some cases, the one or more additional measurements correspond to an additional orientation of the respective hand of the finger. In some examples, the XR input is based on the additional orientation of the respective hand and at least one of the first rotation, the second rotation, and/or the orientation of the structure.

In some cases, an XR input can include scrolling virtual content rendered by the electronic device, scaling an object rendered by the electronic device, rotating the object rendered by the electronic device, moving the object rendered by the electronic device, defining a virtual plane in an environment rendered by the electronic device, and/or placing a virtual object rendered by the electronic device in one or more virtual planes in the environment rendered by the electronic device. In some cases, the XR input can be based on a touch signal corresponding to one or more fingers contacting a second surface of the structure (e.g., second surface 214, contact surface 226), an orientation of the structure, rotation of the wearable device, a movement of a hand associated with the finger, and/or a position of the structure relative to one or more objects.

In some examples, the XR input can be based on one or more properties associated with the one or more measurements. In some cases, the one or more properties can include a magnitude of rotation of the wearable device, a direction of the rotation, a velocity of the rotation, and/or a length of time of a pressure applied to one or more portions of the structure. The one or more properties can be identified by the one or more measurements.

In some cases, the XR input can be based on one or more properties associated with the touch signal. The one or more properties can include a magnitude of pressure from the one or more fingers contacting the second surface of the structure, a motion associated with the one or more fingers when contacting the second surface of the structure, a direction of the motion, a length of time of contact between the one or more fingers and the second surface, and/or a pattern of contact of the second surface of the structure by the one or more fingers. The one or more properties can be identified by the one or more measurements. In some examples, the pattern of contact can include a sequence of contacts by the one or more fingers on the second surface.

In some cases, the XR input can include modifying a virtual element along multiple dimensions in space. In some examples, the virtual element can include a virtual object rendered by the electronic device, a virtual plane in the environment rendered by the electronic device, and/or the environment rendered by the electronic device. In some examples, an adjustment of a first dimension of the multiple dimensions is defined by at least one of an angular change, a rotational velocity, and/or a rotational acceleration associated with a rotation of the wearable device. In some examples, an adjustment of a second dimension of the multiple dimensions is defined by one or more different measurements in the one or more measurements. In some cases, the one or more different measurements in the one or more measurements can include a touch signal corresponding to one or more fingers contacting a second surface of the structure, an orientation of the structure, and/or a position of the structure relative to one or more objects.

In some cases, the one or more measurements can include motion measurements corresponding to a movement of a hand associated with the finger. In some examples, the XR input can correspond to a request to measure a distance in physical space. The distance can be defined by the movement of the hand. For example, the distance can be defined by a first position of the hand prior to or during the movement of the hand, and a second position of the hand after or during the movement of the hand.

In some cases, the wearable device can reduce power consumption and resource usage at the electronic device. For example, the wearable device can offload certain operations such as hand tracking and/or other tracking operations from the electronic device, allowing the electronic device to reduce power consumption and resource usage such as sensor, camera, and/or compute resource usage. In some examples, when tracking operations are offloaded from the electronic device to the wearable device, the electronic device can turn off, or reduce a power mode of, one or more tracking resources such as cameras and/or other sensors that the electronic device would otherwise use to track the user's hands and/or other objects.

In some examples, the wearable device can be equipped with various power saving features. For example, in some cases, the wearable device can save power by shutting down after an XR application on the electronic device has stopped and/or been terminated. As another example, the wearable device can remain off or in a lower power mode, and turn on or switch to higher power mode based on one or more user interactions/inputs. For example, the wearable device can remain off or in a lower power mode, and turn on or switch to higher power mode when the wearable device is rotated by a certain amount.

In some cases, the wearable device can include a wearable ring. In some cases, the one or more sensors can include a position sensor, an accelerometer, a gyroscope, a magnetometer, a pressure sensor, an audio sensor, a touch sensor, and/or an inertial measurement unit.

In some examples, the process 600 may be performed by one or more computing devices or apparatuses. In one illustrative example, the process 600 can be performed by the XR system 100 and/or the ring device 150 shown in FIG. 1 and/or one or more computing devices with the computing device architecture 700 shown in FIG. 7. In some cases, such a computing device or apparatus may include a processor, microprocessor, microcomputer, or other component of a device that is configured to carry out the steps of the process 600. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 600 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 illustrates an example computing device architecture 700 of an example computing device which can implement various techniques described herein. For example, the computing device architecture 700 can implement at least some portions of the XR system 100 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics.

The processor 710 can include any general purpose processor and a hardware or software service stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 775 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include software, code, firmware, etc., for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 775, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Examples of the Disclosure Include:

Aspect 1. A wearable device comprising: a structure defining a receiving space configured to receive a finger associated with a user, the structure comprising a first surface configured to contact the finger received via the receiving space; one or more sensors integrated into the structure, the one or more sensors being configured to detect a rotation of at least a portion of the structure about a longitudinal axis of the receiving space; and a wireless transmitter configured to send to an electronic device, data based on the detected rotation.

Aspect 2. The wearable device of Aspect 1, wherein the data comprises an extended reality input associated with an XR application at the electronic device, and wherein to send the data, the wearable device is configured to send, via the wireless transmitter and to the electronic device, the XR input.

Aspect 3. The wearable device of any of Aspects 1 to 2, wherein the data comprises one or more rotational measurements, and wherein the one or more rotational measurements comprise at least one of a rotational angle, a rotational velocity, and a rotational acceleration.

Aspect 4. The wearable device Aspect 2, wherein the one or more sensors are configured to detect at least one of a touch signal corresponding to one or more fingers contacting a second surface of the structure, an orientation of the structure, and a position of the structure relative to one or more objects, and wherein the data comprises at least one of a magnitude of the touch signal, the orientation of the structure, the position of the structure relative to the one or more objects, and a distance between the structure and at least one of the electronic device directly or indirectly coupled to the wearable device and a different hand than a respective hand of the finger.

Aspect 5. The wearable device of any of Aspects 2 or 4, wherein the wearable device is configured to: send, to the electronic device via the wireless transmitter, one or more measurements from the one or more sensors, the one or more measurements corresponding to an additional orientation of the respective hand of the finger, wherein the XR input is based on the additional orientation of the respective hand and at least one of the rotation and the orientation of the structure.

Aspect 6. The wearable device of any of Aspects 1 to 5, wherein, to detect the rotation of at least a portion of the structure about a longitudinal axis of the receiving space, the one or more sensors are configured to measure at least one of a first rotation of a first portion of the structure about the longitudinal axis of the receiving space and a second rotation of a second portion of the structure about the longitudinal axis of the receiving space.

Aspect 7. The wearable device of Aspect 6, wherein the second rotation is in a direction opposite to the first rotation.

Aspect 8. The wearable device of any of Aspects 1 to 7, wherein the data corresponds to an XR input to an XR application at the electronic device, and wherein the XR input comprises at least one of scrolling virtual content rendered by the electronic device, scaling an object rendered by the electronic device, rotating the object rendered by the electronic device, moving the object rendered by the electronic device, defining a virtual plane in an environment rendered by the electronic device, and placing a virtual object rendered by the electronic device in one or more virtual planes in the environment rendered by the electronic device.

Aspect 9. The wearable device of any of Aspects 1 to 8, wherein the data corresponds to an XR input to an XR application at the electronic device, and wherein the data comprises one or more measurements from the one or more sensors, the one or more measurements comprising at least one of a touch signal corresponding to one or more fingers contacting a second surface of the structure, an orientation of the structure, the rotation, a movement of a hand associated with the finger, and a position of the structure relative to one or more objects.

Aspect 10. The wearable device of any of Aspects 8 or 9, wherein the XR input is based on one or more properties associated with the one or more measurements in the data, the one or more properties comprising at least one of a magnitude of the rotation, a direction of the rotation, a velocity of the rotation, and a length of time of a pressure applied to one or more portions of the structure, the one or more properties being identified by the one or more measurements.

Aspect 11. The wearable device of any of Aspects 8 to 10, wherein the XR input is based on one or more properties associated with the touch signal, the one or more properties comprising at least one of a magnitude of pressure from the one or more fingers contacting the second surface of the structure, a motion associated with the one or more fingers when contacting the second surface of the structure, a direction of the motion, a length of time of contact between the one or more fingers and the second surface, and a pattern of contact of the second surface of the structure by the one or more fingers, the one or more properties being identified by the one or more measurements.

Aspect 12. The wearable device of any of Aspects 1 to 11, wherein the XR input comprises modifying a virtual element along multiple dimensions in space, the virtual element comprising at least one of a virtual object rendered by the electronic device, a virtual plane in an environment rendered by the electronic device, and the environment rendered by the electronic device.

Aspect 13. The wearable device of Aspect 12, wherein an adjustment of a first dimension of the multiple dimensions is defined by at least one of an angular change, a rotational velocity, and a rotational acceleration associated with the rotation, wherein an adjustment of a second dimension of the multiple dimensions is defined by the one or more measurements, and wherein the one or more measurements comprise at least one of a touch signal corresponding to one or more fingers contacting a second surface of the structure, an orientation of the structure, and a position of the structure relative to one or more objects.

Aspect 14. The wearable device of any of Aspects 8 to 13, wherein the one or more measurements comprise motion measurements corresponding to the movement of the hand associated with the finger, and wherein the XR input corresponds to a request to measure a distance in physical space, the distance being defined by the movement of the hand.

Aspect 15. The wearable device of any of Aspects 1 to 14, wherein the wearable device comprises a wearable ring.

Aspect 16. The wearable device of any of Aspects 1 to 15, wherein the wearable device comprises a wearable ring including an outer ring and an inner ring, the inner ring defines the receiving space, and the one or more sensors being configured to detect at least one of an angular change, a rotational velocity, and a rotational acceleration of the outer ring about the longitudinal axis of the receiving space.

Aspect 17. The wearable device of any of Aspects 1 to 16, wherein the wearable device is configured to be turned on from an off state or switched to higher power mode from a lower power mode when the at least a portion of the structure is rotated by a certain amount.

Aspect 18. The wearable device of any of Aspects 1 to 17, wherein the electronic device comprises a mobile device.

Aspect 19. The wearable device of Aspect 18, wherein the mobile device comprises one of a head-mounted display, a mobile phone, a portable computer, or a smart watch.

Aspect 20. The wearable device of any of Aspects 1 to 19, wherein the one or more sensors comprise at least one of a position sensor, an accelerometer, a gyroscope, a pressure sensor, an audio sensor, a touch sensor, and magnetometer.

Aspect 21. A method comprising: detect, via one or more sensors on a wearable device, a rotation of at least a portion of the wearable device about a longitudinal axis of a receiving space associated with the wearable device, the wearable device comprising a structure defining the receiving space, wherein the receiving space is configured to receive a finger associated with a user, and wherein the structure comprises a first surface configured to contact the finger received via the receiving space; and send, to an electronic device via a wireless transmitter of the wearable device, data based on the detected rotation.

Aspect 22. The method of Aspect 21, wherein the data comprises an extended reality input associated with an XR application at the electronic device, and wherein to send the data, the wearable device is configured to send, via the wireless transmitter and to the electronic device, the XR input.

Aspect 23. The method of any of Aspects 21 to 22, wherein the data comprises one or more rotational measurements, and wherein the one or more rotational measurements comprise at least one of a rotational angle, a rotational velocity, and a rotational acceleration.

Aspect 24. The method of any of Aspects 21 to 23, wherein the one or more sensors are configured to detect at least one of a touch signal corresponding to one or more fingers contacting a second surface of the structure, an orientation of the structure, and a position of the structure relative to one or more objects, and wherein the data comprises at least one of a magnitude of the touch signal, the orientation of the structure, the position of the structure relative to the one or more objects, and a distance between the structure and at least one of the electronic device directly or indirectly coupled to the wearable device and a different hand than a respective hand of the finger.

Aspect 25. The method of any of Aspects 22 to 24, further comprising: sending, to the electronic device via the wireless transmitter, one or more measurements from the one or more sensors, the one or more measurements corresponding to an additional orientation of the respective hand of the finger, wherein the XR input is based on the additional orientation of the respective hand and at least one of the rotation and the orientation of the structure.

Aspect 26. The method of any of Aspects 21 to 25, wherein detecting the rotation of at least a portion of the structure about a longitudinal axis of the receiving space further comprises measuring at least one of a first rotation of a first portion of the structure about the longitudinal axis of the receiving space and a second rotation of a second portion of the structure about the longitudinal axis of the receiving space.

Aspect 27. The method of Aspect 26, wherein the second rotation is in a direction opposite to the first rotation.

Aspect 28. The method of any of Aspects 21 to 27, wherein the data corresponds to an XR input to an XR application at the electronic device, and wherein the XR input comprises at least one of scrolling virtual content rendered by the electronic device, scaling an object rendered by the electronic device, rotating the object rendered by the electronic device, moving the object rendered by the electronic device, defining a virtual plane in an environment rendered by the electronic device, and placing a virtual object rendered by the electronic device in one or more virtual planes in the environment rendered by the electronic device.

Aspect 29. The method of any of Aspects 21 to 28, wherein the data corresponds to an XR input to an XR application at the electronic device, and wherein the data comprises one or more measurements from the one or more sensors, the one or more measurements comprising at least one of a touch signal corresponding to one or more fingers contacting a second surface of the structure, an orientation of the structure, the rotation, a movement of a hand associated with the finger, and a position of the structure relative to one or more objects.

Aspect 30. The method of any of Aspects 28 or 29, wherein the XR input is based on one or more properties associated with the one or more measurements in the data, the one or more properties comprising at least one of a magnitude of the rotation, a direction of the rotation, a velocity of the rotation, and a length of time of a pressure applied to one or more portions of the structure, the one or more properties being identified by the one or more measurements.

Aspect 31. The method of any of Aspects 28 to 30, wherein the XR input is based on one or more properties associated with the touch signal, the one or more properties comprising at least one of a magnitude of pressure from the one or more fingers contacting the second surface of the structure, a motion associated with the one or more fingers when contacting the second surface of the structure, a direction of the motion, a length of time of contact between the one or more fingers and the second surface, and a pattern of contact of the second surface of the structure by the one or more fingers, the one or more properties being identified by the one or more measurements.

Aspect 32. The method of any of Aspects 28 to 31, wherein the XR input comprises modifying a virtual element along multiple dimensions in space, the virtual element comprising at least one of a virtual object rendered by the electronic device, a virtual plane in an environment rendered by the electronic device, and the environment rendered by the electronic device.

Aspect 33. The method of Aspect 32, wherein an adjustment of a first dimension of the multiple dimensions is defined by at least one of an angular change, a rotational velocity, and a rotational acceleration associated with the rotation, wherein an adjustment of a second dimension of the multiple dimensions is defined by the one or more measurements, and wherein the one or more measurements comprise at least one of a touch signal corresponding to one or more fingers contacting a second surface of the structure, an orientation of the structure, and a position of the structure relative to one or more objects.

Aspect 34. The method of any of Aspects 28 to 33, wherein the one or more measurements comprise motion measurements corresponding to the movement of the hand associated with the finger, and wherein the XR input corresponds to a request to measure a distance in physical space, the distance being defined by the movement of the hand.

Aspect 35. The method of any of Aspects 21 to 34, wherein the wearable device comprises a wearable ring.

Aspect 36. The method of any of Aspects 21 to 35, wherein the wearable device comprises a wearable ring including an outer ring and an inner ring, the inner ring defines the receiving space, and the one or more sensors being configured to detect at least one of an angular change, a rotational velocity, and a rotational acceleration of the outer ring about the longitudinal axis of the receiving space.

Aspect 37. The method of any of Aspects 21 to 36, further comprising: adjusting a state of the wearable device when the at least a portion of the structure is rotated by a certain amount, wherein adjusting the state comprises turning on one or more components of the electronic device from an off state or switching the one or more components to higher power mode from a lower power mode.

Aspect 38. The method of any of Aspects 21 to 37, wherein the electronic device comprises a mobile device.

Aspect 39. The method of Aspect 38, wherein the mobile device comprises one of a head-mounted display, a mobile phone, a portable computer, or a smart watch.

Aspect 40. The method of any of Aspects 21 to 39, wherein the one or more sensors comprise at least one of a position sensor, an accelerometer, a gyroscope, a pressure sensor, an audio sensor, a touch sensor, and a magnetometer.

Aspect 41. A non-transitory computer-readable medium having stored thereon instructions which, when executed by one or more processing devices, cause the one or more processing devices to perform a method according to any of Aspects 21 to 40.

Aspect 42. A wearable device comprising means for performing a method according to any of Aspects 21 to 40.

Aspect 43. An apparatus comprising: memory; and one or more processors coupled to the memory, the one or more processors being configured to: receive, from a wearable device, data corresponding to a rotation of at least a portion of the wearable device about a longitudinal axis of a receiving space associated with the wearable device, the wearable device comprising a structure defining the receiving space; determine an input based on the data, the input comprising at least one of a user interface input associated with a user interface at the apparatus and an extended reality (XR) input associated with an XR application at the apparatus; and based on the input, control at least one of the user interface and an operation of the XR application.

Aspect 44. The apparatus of Aspect 43, wherein the receiving space is configured to receive a finger associated with a user, and wherein the structure comprises a surface configured to contact the finger received via the receiving space.

Aspect 45. The apparatus of Aspect 43 or 44, wherein the wearable device comprises a ring.

Aspect 46. The apparatus of any of Aspects 43 to 45, wherein the data comprises one or more rotational measurements, and wherein the one or more rotational measurements comprise at least one of a rotational angle, a rotational velocity, and a rotational acceleration.

Aspect 47. The apparatus of any of Aspects 43 to 46, wherein the data corresponds to a touch signal associated with one or more fingers contacting a surface of the wearable device, an orientation of the wearable device, and a position of the wearable device relative to one or more objects, and wherein the data comprises at least one of a magnitude of the touch signal, the orientation of the wearable device, the position of the wearable device relative to the one or more objects, and a distance between the wearable device and at least one of the apparatus and a different hand than a respective hand of the finger.

Aspect 48. The apparatus of Aspect 47, wherein the data comprises one or more measurements from one or more sensors on the wearable device, the one or more measurements corresponding to an additional orientation of the respective hand of the finger, wherein the XR input is based on the additional orientation of the respective hand and at least one of the rotation and the orientation of the structure.

Aspect 49. The apparatus of any of Aspects 43 to 48, wherein the rotation of at least a portion of the wearable device comprises at least one of a first rotation of a first portion of the wearable device about the longitudinal axis of the receiving space and a second rotation of a second portion of the wearable device about the longitudinal axis of the receiving space.

Aspect 50. The apparatus of Aspect 49, wherein the second rotation is in a direction opposite to the first rotation.

Aspect 51. The apparatus of any of Aspects 43 to 50, wherein the XR input comprises at least one of scrolling virtual content rendered by the apparatus, scaling an object rendered by the apparatus, rotating the object rendered by the apparatus, moving the object rendered by the apparatus, defining a virtual plane in an environment rendered by the apparatus, and placing a virtual object rendered by the apparatus in one or more virtual planes in the environment rendered by the apparatus.

Aspect 52. The apparatus of any of Aspects 43 to 51, wherein, to control at least one of the user interface and the operation of the XR application, the one or more processors are configured to: scroll virtual content rendered by the apparatus, scale an object rendered by the apparatus, rotate the object rendered by the apparatus, move the object rendered by the apparatus, define a virtual plane in an environment rendered by the apparatus, and/or place a virtual object rendered by the apparatus in one or more virtual planes in the environment rendered by the apparatus.

Aspect 53. The apparatus of any of Aspects 43 to 52, wherein the data comprises one or more measurements from the one or more sensors, the one or more measurements comprising at least one of a touch signal corresponding to one or more fingers contacting a surface of the wearable device, an orientation of the wearable device, the rotation, a movement of a hand associated with the finger, and a position of the wearable device relative to one or more objects.

Aspect 54. The apparatus of any of Aspects 43 to 53, wherein the XR input is based on one or more properties associated with the one or more measurements in the data, the one or more properties comprising at least one of a magnitude of the rotation, a direction of the rotation, a velocity of the rotation, and a length of time of a pressure applied to one or more portions of the wearable device, the one or more properties being identified by the one or more measurements.

Aspect 55. The apparatus of any of Aspects 43 to 54, wherein the XR input is based on one or more properties associated with a touch signal, the one or more properties comprising at least one of a magnitude of pressure from the one or more fingers contacting a surface of the wearable device, a motion associated with the one or more fingers when contacting the surface of the wearable device, a direction of the motion, a length of time of contact between the one or more fingers and the surface, and a pattern of contact of the surface of the wearable device by the one or more fingers, the one or more properties being identified by the one or more measurements.

Aspect 56. The apparatus of any of Aspects 43 to 55, wherein the one or more processor are configured to: modify, based on the XR input, a virtual element along multiple dimensions in space, the virtual element comprising at least one of a virtual object rendered by the apparatus, a virtual plane in an environment rendered by the apparatus, and the environment rendered by the apparatus.

Aspect 57. The apparatus of Aspect 56, wherein an adjustment of a first dimension of the multiple dimensions is defined by at least one of an angular change, a rotational velocity, and a rotational acceleration associated with the rotation, wherein an adjustment of a second dimension of the multiple dimensions is defined by the one or more measurements, and wherein the one or more measurements comprise at least one of a touch signal corresponding to one or more fingers contacting a second surface of the wearable device, an orientation of the wearable device, and a position of the wearable device relative to one or more objects.

Aspect 58. The apparatus of any of Aspects 43 to 57, wherein the data comprises motion measurements corresponding to movement of a hand associated with the finger, and wherein the XR input corresponds to a request to measure a distance in physical space, the distance being defined by the movement of the hand.

Aspect 59. The apparatus of Aspect 58, wherein the one or more processors are configured to: measure the distance in physical space based on the XR input.

Aspect 60. The apparatus of any of Aspects 43 to 59, wherein the wearable device comprises a wearable ring including one or more sensors, an outer ring and an inner ring, the inner ring defines the receiving space, and the one or more sensors being configured to detect at least one of an angular change, a rotational velocity, and a rotational acceleration of the outer ring about the longitudinal axis of the receiving space.

Aspect 61. The apparatus of any of Aspects 43 to 60, wherein the one or more processors are configured to: based on the data, turn on one or more components of the apparatus from an off state or switching the one or more components to higher power mode from a lower power mode.

Aspect 62. The apparatus of any of Aspects 43 to 61, wherein the apparatus comprises a mobile device.

Aspect 63. The apparatus of Aspect 62, wherein the mobile device comprises one of a head-mounted display, a mobile phone, a portable computer, or a smart watch.

Aspect 64. A method comprising: receiving, by an electronic device and from a wearable device, data corresponding to a rotation of at least a portion of the wearable device about a longitudinal axis of a receiving space associated with the wearable device, the wearable device comprising a structure defining the receiving space; determining an input based on the data, the input comprising at least one of a user interface input associated with a user interface at the electronic device and an extended reality (XR) input associated with an XR application at the electronic device; and based on the input, control at least one of the user interface and an operation of the XR application.

Aspect 65. The method of Aspect 64, wherein the receiving space is configured to receive a finger associated with a user, and wherein the structure comprises a surface configured to contact the finger received via the receiving space.

Aspect 66. The method of Aspect 64 or 65, wherein the wearable device comprises a ring.

Aspect 67. The method of any of Aspects 64 to 66, wherein the data comprises one or more rotational measurements, and wherein the one or more rotational measurements comprise at least one of a rotational angle, a rotational velocity, and a rotational acceleration.

Aspect 68. The method of any of Aspects 64 to 67, wherein the data corresponds to a touch signal associated with one or more fingers contacting a surface of the wearable device, an orientation of the wearable device, and a position of the wearable device relative to one or more objects, and wherein the data comprises at least one of a magnitude of the touch signal, the orientation of the wearable device, the position of the wearable device relative to the one or more objects, and a distance between the wearable device and at least one of the electronic device and a different hand than a respective hand of the finger.

Aspect 69. The method of Aspect 68, wherein the data comprises one or more measurements from one or more sensors on the wearable device, the one or more measurements corresponding to an additional orientation of the respective hand of the finger, wherein the XR input is based on the additional orientation of the respective hand and at least one of the rotation and the orientation of the structure.

Aspect 70. The method of any of Aspects 64 to 69, wherein the rotation of at least a portion of the wearable device comprises at least one of a first rotation of a first portion of the wearable device about the longitudinal axis of the receiving space and a second rotation of a second portion of the wearable device about the longitudinal axis of the receiving space.

Aspect 71. The method of Aspect 70, wherein the second rotation is in a direction opposite to the first rotation.

Aspect 72. The method of any of Aspects 64 to 71, wherein the XR input comprises at least one of scrolling virtual content rendered by the electronic device, scaling an object rendered by the electronic device, rotating the object rendered by the electronic device, moving the object rendered by the electronic device, defining a virtual plane in an environment rendered by the electronic device, and placing a virtual object rendered by the electronic device in one or more virtual planes in the environment rendered by the electronic device.

Aspect 73. The method of any of Aspects 64 to 72, wherein controlling at least one of the user interface and the operation of the XR application comprises scrolling virtual content rendered by the electronic device, scaling an object rendered by the electronic device, rotating the object rendered by the electronic device, moving the object rendered by the electronic device, defining a virtual plane in an environment rendered by the electronic device, and/or placing a virtual object rendered by the electronic device in one or more virtual planes in the environment rendered by the electronic device.

Aspect 74. The method of any of Aspects 64 to 73, wherein the data comprises one or more measurements from the one or more sensors, the one or more measurements comprising at least one of a touch signal corresponding to one or more fingers contacting a surface of the wearable device, an orientation of the wearable device, the rotation, a movement of a hand associated with the finger, and a position of the wearable device relative to one or more objects.

Aspect 75. The method of any of Aspects 64 to 74, wherein the XR input is based on one or more properties associated with the one or more measurements in the data, the one or more properties comprising at least one of a magnitude of the rotation, a direction of the rotation, a velocity of the rotation, and a length of time of a pressure applied to one or more portions of the wearable device, the one or more properties being identified by the one or more measurements.

Aspect 76. The method of any of Aspects 64 to 75, wherein the XR input is based on one or more properties associated with a touch signal, the one or more properties comprising at least one of a magnitude of pressure from the one or more fingers contacting a surface of the wearable device, a motion associated with the one or more fingers when contacting the surface of the wearable device, a direction of the motion, a length of time of contact between the one or more fingers and the surface, and a pattern of contact of the surface of the wearable device by the one or more fingers, the one or more properties being identified by the one or more measurements.

Aspect 77. The method of any of Aspects 64 to 76, further comprising modifying, based on the XR input, a virtual element along multiple dimensions in space, the virtual element comprising at least one of a virtual object rendered by the electronic device, a virtual plane in an environment rendered by the electronic device, and the environment rendered by the electronic device.

Aspect 78. The method of Aspect 77, wherein an adjustment of a first dimension of the multiple dimensions is defined by at least one of an angular change, a rotational velocity, and a rotational acceleration associated with the rotation, wherein an adjustment of a second dimension of the multiple dimensions is defined by the one or more measurements, and wherein the one or more measurements comprise at least one of a touch signal corresponding to one or more fingers contacting a second surface of the wearable device, an orientation of the wearable device, and a position of the wearable device relative to one or more objects.

Aspect 79. The method of any of Aspects 64 to 78, wherein the data comprises motion measurements corresponding to movement of a hand associated with the finger, and wherein the XR input corresponds to a request to measure a distance in physical space, the distance being defined by the movement of the hand.

Aspect 80. The method of Aspect 79, further comprising measuring the distance in physical space based on the XR input.

Aspect 81. The method of any of Aspects 64 to 80, wherein the wearable device comprises a wearable ring including one or more sensors, an outer ring and an inner ring, the inner ring defines the receiving space, and the one or more sensors being configured to detect at least one of an angular change, a rotational velocity, and a rotational acceleration of the outer ring about the longitudinal axis of the receiving space.

Aspect 82. The method of any of Aspects 64 to 81, further comprising, based on the data, turning on one or more components of the electronic device from an off state or switching the one or more components to higher power mode from a lower power mode.

Aspect 83. The method of any of Aspects 64 to 82, wherein the electronic device comprises a mobile device.

Aspect 84. The method of Aspect 83, wherein the mobile device comprises one of a head-mounted display, a mobile phone, a portable computer, or a smart watch.

Aspect 85. An apparatus comprising means for performing a method according to any of Aspects 64 to 84.

Aspect 86. A non-transitory computer-readable medium having stored thereon instructions which, when executed by one or more processors, cause the one or more processors to perform a method according to any of Aspects 64 to 84.

What is claimed is:

1. A wearable device comprising:
   a structure defining a receiving space configured to receive a finger associated with a user, the structure comprising a first surface configured to contact the finger received via the receiving space;
   one or more sensors integrated into the structure, the one or more sensors being configured to detect a rotation of at least a portion of the structure about a longitudinal axis of the receiving space;
   a light-emitting component configured to emit light in response to a rotation amount of the detected rotation of at least the portion of the structure being above a threshold and not emit light when the rotation amount of the detected rotation is less than the threshold, the light being emitted for detection as an input by an electronic device; and
   a wireless transmitter configured to send to the electronic device, data based on the detected rotation.

2. The wearable device of claim 1, wherein the data comprises an extended reality (XR) input associated with an XR application at the electronic device, and wherein to send the data, the wearable device is configured to send, via the wireless transmitter and to the electronic device, the XR input.

3. The wearable device of claim 2, wherein the data comprises one or more rotational measurements, and wherein the one or more rotational measurements comprise at least one of a rotational angle, a rotational velocity, or a rotational acceleration.

4. The wearable device of claim 2, wherein the one or more sensors are configured to detect at least one of a touch signal corresponding to one or more fingers contacting a second surface of the structure, an orientation of the structure, or a position of the structure relative to one or more objects, and wherein the data comprises at least one of a magnitude of the touch signal, the orientation of the structure, the position of the structure relative to the one or more objects, or a distance between the structure and at least one of the electronic device directly or indirectly coupled to the wearable device or a different hand than a respective hand of the finger.

5. The wearable device of claim 4, wherein the wearable device is configured to:
   send, to the electronic device via the wireless transmitter, one or more measurements from the one or more sensors, the one or more measurements corresponding to an additional orientation of the respective hand of the finger, wherein the XR input is based on the additional orientation of the respective hand and at least one of the rotation or the orientation of the structure.

6. The wearable device of claim 1, wherein, to detect the rotation of at least a portion of the structure about a longitudinal axis of the receiving space, the one or more sensors are configured to measure at least one of a first rotation of a first portion of the structure about the longitudinal axis of the receiving space or a second rotation of a second portion of the structure about the longitudinal axis of the receiving space.

7. The wearable device of claim 6, wherein the second rotation is in a direction opposite to the first rotation.

8. The wearable device of claim 1, wherein the data corresponds to an XR input to an XR application at the electronic device, and wherein the XR input comprises at least one of scrolling virtual content rendered by the electronic device, scaling an object rendered by the electronic device, rotating the object rendered by the electronic device, moving the object rendered by the electronic device, defining a virtual plane in an environment rendered by the electronic device, or placing a virtual object rendered by the electronic device in one or more virtual planes in the environment rendered by the electronic device.

9. The wearable device of claim 1, wherein the data corresponds to an XR input to an XR application at the electronic device, and wherein the data comprises one or more measurements from the one or more sensors, the one or more measurements comprising at least one of a touch signal corresponding to one or more fingers contacting a second surface of the structure, an orientation of the structure, the rotation, a movement of a hand associated with the finger, or a position of the structure relative to one or more objects.

10. The wearable device of claim 9, wherein the XR input is based on one or more properties associated with the one or more measurements in the data, the one or more properties comprising at least one of a magnitude of the rotation, a direction of the rotation, a velocity of the rotation, or a length of time of a pressure applied to one or more portions of the structure, the one or more properties being identified by the one or more measurements.

11. The wearable device of claim 9, wherein the XR input is based on one or more properties associated with the touch signal, the one or more properties comprising at least one of a magnitude of pressure from the one or more fingers contacting the second surface of the structure, a motion associated with the one or more fingers when contacting the second surface of the structure, a direction of the motion, a length of time of contact between the one or more fingers and the second surface, or a pattern of contact of the second surface of the structure by the one or more fingers, the one or more properties being identified by the one or more measurements.

12. The wearable device of claim 9, wherein the XR input comprises modifying a virtual element along multiple dimensions in space, the virtual element comprising at least one of a virtual object rendered by the electronic device, a virtual plane in an environment rendered by the electronic device, or the environment rendered by the electronic device.

13. The wearable device of claim 12, wherein an adjustment of a first dimension of the multiple dimensions is defined by at least one of an angular change, a rotational velocity, or a rotational acceleration associated with the rotation, wherein an adjustment of a second dimension of the multiple dimensions is defined by the one or more measurements, and wherein the one or more measurements comprise at least one of a touch signal corresponding to one or more fingers contacting a second surface of the structure, an orientation of the structure, or a position of the structure relative to one or more objects.

14. The wearable device of claim 9, wherein the one or more measurements comprise motion measurements corresponding to the movement of the hand associated with the finger, and wherein the XR input corresponds to a request to measure a distance in physical space, the distance being defined by the movement of the hand.

15. The wearable device of claim 1, wherein the wearable device comprises a wearable ring.

16. The wearable device of claim 1, wherein the wearable device comprises a wearable ring including an outer ring and an inner ring, the inner ring defines the receiving space, and the one or more sensors being configured to detect at least one of an angular change, a rotational velocity, or a rotational acceleration of the outer ring about the longitudinal axis of the receiving space.

17. The wearable device of claim 1, wherein the wearable device is configured to be turned on from an off state or switched to higher power mode from a lower power mode when at least the portion of the structure is rotated by a certain amount.

18. The wearable device of claim 1, wherein the electronic device comprises a mobile device.

19. The wearable device of claim 18, wherein the mobile device comprises one of a head-mounted display, a mobile phone, a portable computer, or a smart watch.

20. The wearable device of claim 1, wherein the one or more sensors comprise at least one of a position sensor, an accelerometer, a gyroscope, a pressure sensor, an audio sensor, a touch sensor, or a magnetometer.

21. The wearable device of claim 1, wherein the light-emitting component is configured to emit the light for detection by at least one camera of the electronic device.

22. The wearable device of claim 1, wherein the light-emitting component is a light-emitting diode (LED).

23. The wearable device of claim 1, wherein a type of the input is based on a magnitude of the rotation amount of the detected rotation.

24. A method comprising:
detecting, via one or more sensors on a wearable device, a rotation of at least a portion of the wearable device about a longitudinal axis of a receiving space associated with the wearable device, the wearable device comprising a structure defining the receiving space, wherein the receiving space is configured to receive a finger associated with a user, and wherein the structure comprises a first surface configured to contact the finger received via the receiving space; and
emitting, via a light-emitting component of the wearable device, light in response to a rotation amount of the detected rotation of at least the portion of the structure being above a threshold, wherein light is not emitted when the rotation amount of the detected rotation is less than the threshold, the light being emitted for detection as an input by an electronic device.

25. The method of claim 24, further comprising:
sending, to the electronic device via a wireless transmitter of the wearable device, data based on the detected rotation, wherein the data comprises an extended reality (XR) input associated with an XR application at the electronic device, and wherein to send the data, the wearable device is configured to send, via the wireless transmitter and to the electronic device, the XR input.

26. The method of claim 25, wherein the data comprises one or more rotational measurements, and wherein the one or more rotational measurements comprise at least one of a rotational angle, a rotational velocity, or a rotational acceleration.

27. The method of claim 25, wherein the one or more sensors are configured to detect at least one of a touch signal corresponding to one or more fingers contacting a second surface of the structure, an orientation of the structure, or a position of the structure relative to one or more objects, and wherein the data comprises at least one of a magnitude of the touch signal, the orientation of the structure, the position of the structure relative to the one or more objects, and a distance between the structure and at least one of the electronic device directly or indirectly coupled to the wearable device or a different hand than a respective hand of the finger.

28. The method of claim 27, further comprising:
sending, to the electronic device via the wireless transmitter, one or more measurements from the one or more sensors, the one or more measurements corresponding to an additional orientation of the respective hand of the finger, wherein the XR input is based on the additional orientation of the respective hand and at least one of the rotation or the orientation of the structure.

29. The method of claim 24, wherein detecting the rotation of at least a portion of the structure about a longitudinal axis of the receiving space further comprises measuring at least one of a first rotation of a first portion of the structure about the longitudinal axis of the receiving space or a second rotation of a second portion of the structure about the longitudinal axis of the receiving space.

30. The method of claim 29, wherein the second rotation is in a direction opposite to the first rotation.

31. The method of claim 25, wherein the data corresponds to an XR input to an XR application at the electronic device, and wherein the XR input comprises at least one of scrolling virtual content rendered by the electronic device, scaling an object rendered by the electronic device, rotating the object rendered by the electronic device, moving the object rendered by the electronic device, defining a virtual plane in an environment rendered by the electronic device, or placing a virtual object rendered by the electronic device in one or more virtual planes in the environment rendered by the electronic device.

32. The method of claim 25, wherein the data corresponds to an XR input to an XR application at the electronic device, and wherein the data comprises one or more measurements from the one or more sensors, the one or more measurements comprising at least one of a touch signal corresponding to one or more fingers contacting a second surface of the structure, an orientation of the structure, the rotation, a movement of a hand associated with the finger, or a position of the structure relative to one or more objects.

33. The method of claim 32, wherein the XR input is based on one or more properties associated with the one or more measurements in the data, the one or more properties comprising at least one of a magnitude of the rotation, a direction of the rotation, a velocity of the rotation, or a length of time of a pressure applied to one or more portions of the structure, the one or more properties being identified by the one or more measurements.

34. The method of claim 32, wherein the XR input is based on one or more properties associated with the touch signal, the one or more properties comprising at least one of a magnitude of pressure from the one or more fingers contacting the second surface of the structure, a motion associated with the one or more fingers when contacting the second surface of the structure, a direction of the motion, a length of time of contact between the one or more fingers and the second surface, or a pattern of contact of the second surface of the structure by the one or more fingers, the one or more properties being identified by the one or more measurements.

35. The method of claim 32, wherein the XR input comprises modifying a virtual element along multiple dimensions in space, the virtual element comprising at least one of a virtual object rendered by the electronic device, a virtual plane in an environment rendered by the electronic device, or the environment rendered by the electronic device.

36. The method of claim 35, wherein an adjustment of a first dimension of the multiple dimensions is defined by at least one of an angular change, a rotational velocity, and a rotational acceleration associated with the rotation, wherein an adjustment of a second dimension of the multiple dimensions is defined by the one or more measurements, and wherein the one or more measurements comprise at least one of a touch signal corresponding to one or more fingers contacting a second surface of the structure, an orientation of the structure, or a position of the structure relative to one or more objects.

37. The method of claim 32, wherein the one or more measurements comprise motion measurements corresponding to the movement of the hand associated with the finger, and wherein the XR input corresponds to a request to measure a distance in physical space, the distance being defined by the movement of the hand.

38. The method of claim 24, wherein the wearable device comprises a wearable ring.

39. The method of claim 24, wherein the wearable device comprises a wearable ring including an outer ring and an inner ring, the inner ring defines the receiving space, and the one or more sensors being configured to detect at least one of an angular change, a rotational velocity, or a rotational acceleration of the outer ring about the longitudinal axis of the receiving space.

40. The method of claim 24, further comprising:
adjusting a state of the wearable device when at least the portion of the structure is rotated by a certain amount, wherein adjusting the state comprises turning on one or more components of the wearable device from an off state or switching the one or more components to higher power mode from a lower power mode.

41. The method of claim 25, wherein the electronic device comprises a mobile device.

42. The method of claim 41, wherein the mobile device comprises one of a head-mounted display, a mobile phone, a portable computer, or a smart watch.

43. The method of claim 24, wherein the one or more sensors comprise at least one of a position sensor, an accelerometer, a gyroscope, a pressure sensor, an audio sensor, a touch sensor, or a magnetometer.

44. The wearable device of claim 1, wherein the light-emitting component is a light detection and ranging (LIDAR) component.

45. The method of claim 24, wherein the light is emitted via the light-emitting component for detection by at least one camera of the electronic device.

46. The method of claim 24, wherein the light-emitting component is a light-emitting diode (LED).

47. The method of claim 24, wherein the light-emitting component is a light detection and ranging (LIDAR) component.

48. The method of claim 24, wherein a type of the input is based on a magnitude of the rotation amount of the detected rotation.

* * * * *